(12) United States Patent
Lim et al.

(10) Patent No.: US 10,239,143 B2
(45) Date of Patent: Mar. 26, 2019

(54) SLAB SCARFING APPARATUS AND METHOD FOR CONTROLLING THE SAME

(71) Applicant: POSCO, Pohang-si (KR)

(72) Inventors: Seung-Ho Lim, Goyang-si (KR);
Yeong-Seon Park, Gwangyang-si (KR);
Seong-Yeon Kim, Gwangyang-si (KR);
Ki-Hwan Kim, Pohang-si (KR);
Ji-Won Yu, Incheon (KR)

(73) Assignee: POSCO, Pohang-si (KR)

( * ) Notice: Subject to any disclaimer, the term of this patent is extended or adjusted under 35 U.S.C. 154(b) by 153 days.

(21) Appl. No.: 15/107,281

(22) PCT Filed: Dec. 22, 2014

(86) PCT No.: PCT/KR2014/012624
§ 371 (c)(1),
(2) Date: Jun. 22, 2016

(87) PCT Pub. No.: WO2015/099372
PCT Pub. Date: Jul. 2, 2015

(65) Prior Publication Data
US 2016/0368073 A1    Dec. 22, 2016

(30) Foreign Application Priority Data

Dec. 23, 2013  (KR) .................. 10-2013-0161457
Nov. 12, 2014  (KR) .................. 10-2014-0157033

(51) Int. Cl.
*B23K 7/06* (2006.01)
*B23K 7/10* (2006.01)
(Continued)

(52) U.S. Cl.
CPC .............. *B23K 7/06* (2013.01); *B22D 11/126* (2013.01); *B23K 7/003* (2013.01); *B23K 7/102* (2013.01);
(Continued)

(58) Field of Classification Search
CPC ........ B22D 11/126; B23K 7/003; B23K 7/06; B23K 7/102
(Continued)

(56) References Cited

U.S. PATENT DOCUMENTS 3,254,696 A    6/1966  Grimm
5,304,256 A *  4/1994  Showalter ............... B23K 7/06
                                                  148/202

FOREIGN PATENT DOCUMENTS

JP    49040265    4/1974
JP    49041250    4/1974
(Continued)

OTHER PUBLICATIONS

International Search Report—PCT/KR2014/012624 dated Mar. 25, 2015.
(Continued)

*Primary Examiner* — Scott R Kastler
*Assistant Examiner* — Michael Aboagye
(74) *Attorney, Agent, or Firm* — Cantor Colburn LLP

(57) ABSTRACT

A slab scarfing apparatus comprises: an upper nozzle unit having an upper surface nozzle for scarfing an edge portion of the upper surface of a slab and having a first side nozzle scarfing an upper edge portion of the side surface of the slab and moving together with the upper surface nozzle; a lower nozzle unit having a lower nozzle for scarfing an edge portion of the lower surface of the slab and having a second side nozzle scarfing a lower edge portion of the side surface of the slab and moving together with the lower nozzle; and a moving apparatus for moving the upper nozzle unit and the lower nozzle unit to allow the upper nozzle unit and the lower nozzle unit to be adjacent to or to be spaced apart from an edge portion of the slab. A method of controlling the apparatus is provided.

14 Claims, 35 Drawing Sheets

(51) Int. Cl.
   *B22D 11/126* (2006.01)
   *B23K 7/00* (2006.01)
   *B23K 101/18* (2006.01)
   *B23K 103/04* (2006.01)
   *B23K 103/06* (2006.01)

(52) U.S. Cl.
   CPC ...... *B23K 2101/18* (2018.08); *B23K 2103/04* (2018.08); *B23K 2103/06* (2018.08)

(58) Field of Classification Search
   USPC .................................................. 266/51, 52
   See application file for complete search history.

(56) References Cited

FOREIGN PATENT DOCUMENTS

| | | |
|---|---|---|
| JP | 51130612 | 11/1976 |
| JP | 54060255 | 5/1979 |
| JP | 5476334 | 11/1979 |
| JP | 5811305 | 3/1983 |
| JP | 08254305 | 10/1996 |
| KR | 20020001395 | 1/2002 |
| KR | 20040047286 | 6/2004 |
| KR | 100729803 | 6/2007 |
| KR | 20110031817 | 3/2011 |
| KR | 20120001823 | 1/2012 |
| KR | 20120071079 | 7/2012 |
| KR | 20140081530 | 7/2014 |
| KR | 20140082496 | 7/2014 |
| WO | 80002667 | 12/1980 |

OTHER PUBLICATIONS

Korean Office Action—Korean Application No. 10-2014-0157033 dated Feb. 29, 2016, citing KR 10-0729803; KR 10-2002-0001395; KR 10-2011-0031817 and KR 10-2012-0071079.
Chinese Notice of Allowance—Chinese Application No. 201480070610.7 dated Oct. 10, 2018.

* cited by examiner

SLAB SCARFING APPARATUS AND METHOD FOR CONTROLLING THE SAME

TECHNICAL FIELD

The present invention relates to a slab scarfing apparatus which scarfs a corner portion of a slab manufactured during a casting process and a method of controlling the same.

BACKGROUND ART

Slabs manufactured by a continuous casting process are molded, cut into pieces with an appropriate length, heated in a reheating furnace, and then inserted into a rolling mill, thereby manufacturing hot rolled coils. However, slabs manufactured by the continuous casting process generally have corner cracks in corner areas. Particularly, a steel of a grade such as medium carbon steel having peritectic transformation has serious corner cracks.

Corner cracks of slabs may cause manufacturing accidents such as fractures of panels during a rolling process and may cause defects such as edge scabs in manufactured hot rolled coils to require cutting out a considerable amount of corner portions of hot rolled coils. Accordingly, slabs of a steel grade which easily have corner cracks therein have been scarfed to remove corner portions before a rolling process. Also, since sharp corners of slabs intensively wear and tear particular portions of a rolling mill during a rolling process and shorten a life of the rolling mill, it is necessary to scarf corners of slabs also to protect the rolling mill.

Hitherto, scarfing operation was performed by scarfing corner portions of a slab while a worker directly carried a scarfing nozzle like an example disclosed in U.S. Pat. No. 3,254,696. However, in this way, since a worker must work in a poor environment while wearing heat proof clothes, intensity of work is very high, there is a risk of safety accidents, and because it is difficult to stably maintain a scarfing nozzle during a working process, scarfed surfaces are uneven.

To improve this, Korean Patent Publication No. 10-2012-0001823 discloses a method of embodying a fast and stable scarfing by scarfing corner portions of a slab using a torch type cutting device while the slab is being transferred.

Meanwhile, it is necessary for scarfing to change a scarfing shape of corner portions according to the steel grade of a slab, temperature, and scarfing speed. However, the conventional scarfing device has an inconvenience associated with having to replace the whole scarfing nozzle to change the scarfing shape. Also, when a thickness of a slab to be scarfed changes, it is necessary to replace a nozzle or adjust a position of the nozzle again.

DISCLOSURE

Technical Problem

It is an aspect of the present invention to provide a slab scarfing apparatus capable of embodying stable scarfing of corner portions of a slab while moving the slab and a method of controlling the same.

It is another aspect of the present invention to provide a slab scarfing apparatus which allows a scarfing shape of a corner portion of a slab to be easily changed according to a steel grade or scarfing conditions and a method of controlling the same.

It is still another aspect of the present invention to provide a slab scarfing apparatus capable of embodying scarfing of a slab with a different thickness without replacing a nozzle and selecting and scarfing at least one of four corners of the slab and a method of controlling the same.

Technical Solution

One aspect of the present invention provides a slab scarfing apparatus including an upper nozzle unit which includes an upper surface nozzle which scarfs a corner portion of an upper surface of a slab and a first side nozzle which moves together with the upper surface nozzle while scarfing an upper corner portion of a side of the slab, a lower nozzle unit which includes a lower surface nozzle unit which scarfs a corner portion of a lower surface of the slab and a second side nozzle which moves together with the lower surface nozzle while scarfing a lower corner portion of the side of the slab, and a movement apparatus which moves the upper nozzle unit and the lower nozzle unit to be closer to or away from a corner portion of the slab.

The movement apparatus may include a first vertical movement portion which vertically moves the upper nozzle unit, a second vertical movement portion which vertically moves the lower nozzle unit, and a laterally moving portion which laterally moves while supporting the first vertical movement portion and the second vertical movement portion.

The slab scarfing apparatus may further include a frame capable of moving in a direction intersecting with a moving direction of the slab while mounted on the laterally moving portion, a moving rail which guides movement of the frame, and a frame driving portion which moves the frame.

The laterally moving portion may include a first moving body supported by the frame to be movable in a lateral direction, a first lateral driving portion which laterally moves the first moving body with respect to the frame, a second moving body supported by the first moving body to be movable in the lateral direction, and a second lateral driving portion which laterally moves the second moving body with respect to the first moving body.

The first vertical movement portion may include a first elevating member elevatably supported by the second moving portion and a first elevation driving portion which vertically moves the first elevating member, and the second vertical movement portion may include a second elevating member elevatably supported by the second moving portion and a second elevation driving portion which vertically moves the second elevating member.

The upper nozzle unit may include an upper nozzle frame which includes a horizontal supporting portion mounted with the upper surface nozzle a vertical supporting portion mounted with the first side nozzle, and the lower nozzle unit may include a lower nozzle frame which includes a horizontal supporting portion mounted with the lower surface nozzle and a vertical supporting portion mounted with the second side nozzle.

The upper surface nozzle may be mounted on the horizontal supporting portion of the upper nozzle frame to be position-adjustable in a width direction of the slab, and the lower surface nozzle may be mounted on the horizontal supporting portion of the lower nozzle frame to be position-adjustable in the width direction of the slab.

The first side nozzle may be mounted on the vertical supporting portion of the upper nozzle frame to be adjustable in position in a moving direction of the slab, and the second side nozzle may be mounted on the vertical supporting portion of the lower nozzle frame to be adjustable in position in the moving direction of the slab.

The upper surface nozzle, the first side nozzle, the lower surface nozzle, and the second side nozzle may be detachably mounted using fastening members formed of a material with strength lower than that thereof.

The slab scarfing apparatus may further include an upper guide unit which is installed on the upper nozzle unit to be in contact with an upper surface of the slab and maintains a gap between the upper surface of the slab and the upper surface nozzle and a side guide unit which is installed to be in contact with a side of the slab and maintains a gap between the side of the slab and the first side nozzle.

The upper guide unit may be provided to protrude in a direction in which the slab enters rather than the upper surface nozzle.

The upper guide unit may include a front guide wheel located ahead of an injection hole of the upper surface nozzle in a direction in which the slab enters and in contact with the upper surface of the slab, a rear guide wheel located behind the injection hole of the upper surface nozzle in a direction in which the slab moves and in contact with the upper surface of the slab, and a wheel housing which rotatably supports the front guide wheel and the rear guide wheel.

External shapes of cross sections of the front guide wheel and the rear guide wheel in contact with the slab may be curved surfaces.

The wheel housing may include an injection nozzle which injects cooling water to the front guide wheel and the rear guide wheel.

The side guide unit may include one or more side guide wheels in contact with the side of the slab and a wheel housing which supports the side guide wheel.

The slab scarfing apparatus may further include a spacer interposed between the upper nozzle unit and the lower nozzle unit to maintain a gap between the upper nozzle unit and the lower nozzle unit.

The upper surface nozzle and the lower surface nozzle may each include a preheating gas injection hole which forms flames for preheating the slab and an oxygen injection hole which embodies scarfing by injecting high pressure oxygen to a portion of the slab to be preheated.

The upper surface nozzle and the lower surface nozzle may each further include a fuel gas injection hole which heats the oxygen injected by the oxygen injection hole and guides an injection direction.

The preheating gas injection hole may include a plurality of injection holes which are disposed spaced apart and have diameters gradually increasing as getting closer to a corner from a central portion of the slab.

The preheating gas injection hole may include a plurality of injection holes which are disposed spaced apart and gradually densely arranged by having the separation distances decrease as getting closer to a corner from a central portion of the slab.

The upper surface nozzle and the lower surface nozzle may each include an outlet cartridge partially detachably mounted to change a shape of the oxygen injection hole.

The oxygen injection hole may be formed lengthwise in a width direction of the slab with a flow width gradually increasing as getting closer to the corner of the slab.

The upper nozzle unit may further include an oxygen injection hole disposed on a side of the upper surface nozzle to inject oxygen to a portion to be scarfed by the upper surface nozzle and an auxiliary upper nozzle including a fuel gas injection hole which heats the oxygen injected by the oxygen injection hole and guides the injection.

The lower nozzle unit may further include an oxygen injection hole disposed on a side of the lower surface nozzle to inject oxygen to a portion to be scarfed by the lower surface nozzle and an auxiliary lower nozzle including a fuel gas injection hole which heats the oxygen injected by the oxygen injection hole and guides the injection.

The upper surface nozzle and the lower surface nozzle may each include an outlet cartridge partially detachably mounted to change a shape of the oxygen injection hole.

The first side nozzle may include an oxygen injection hole which injects oxygen for scarfing to an upper corner portion of a side of the slab and a fuel gas injection hole which heats the oxygen injected by the oxygen injection hole and guides the injection.

The second side nozzle may include an oxygen injection hole which injects oxygen for scarfing to a lower corner portion of the side of the slab and a fuel gas injection hole which heats the oxygen injected by the oxygen injection hole and guides the injection.

The first side nozzle and the second side nozzle may each include an outlet cartridge partially detachably mounted to change a shape of the oxygen injection hole.

The slab scarfing apparatus may further include a cooling system which circulates cooling water through the upper nozzle unit and the lower nozzle unit. Herein, the cooling system may include a cooling water tank, a cooling water pump which supplies the cooling water of the cooling water tank to cooling water paths of the upper nozzle unit and the lower nozzle unit, a water collecting header which collects and returns the cooling water passing through the upper nozzle unit and the lower nozzle unit to the cooling water tank, a thermal exchanger in which the cooling water which returns to the cooling water tank from the water collecting header undergoes a thermal exchange with an external cooling means, a fluid flow sensor installed on a path for collecting the cooling water passing through the upper nozzle unit and the lower nozzle unit, and a temperature sensor which senses a temperature of the cooling water collected in the water collecting header.

The slab scarfing apparatus may further include a slag chamber which is installed to surround front areas of the upper nozzle unit and the lower nozzle unit which the slab enters and collects slag scattered by scarfing of the slab and a high pressure water injection apparatus disposed in a slag scattering area inside the slag chamber.

The high pressure water injection apparatus may include an upper high pressure water nozzle which injects high pressure water to the side of the slab from an upper corner portion of the slab, a lower high pressure water injection apparatus which injects high pressure water to the side of the slab from a lower corner portion of the slab, and a vertical high pressure water nozzle which injects high pressure water in a thickness direction of the slab from the side of the slab.

The slab scarfing apparatus may further include a correction device which corrects a posture of the slab on a transfer path before the scarfing area entering a scarfing area in which the upper nozzle unit and the lower nozzle unit are located, a width measuring sensor which measures a width of the slab to sense eccentricity of the entering slab which have passed through the correction device, an entry sensor which senses an entry of a fore end of the slab at a position before the scarfing area, a pinch roll which transfers the slab to the scarfing area in a clamped state after the entry of the slab, and a nozzle position sensor which senses elevated positions of the upper and lower nozzle units to prevent a collision of the slab and the upper and lower nozzle units.

The slab scarfing apparatus may further include a flexure sensor which measures flexure of the slab on a transfer path before the scarfing area entering a scarfing area where the upper nozzle unit and the lower nozzle unit are located and a flexure correction device which corrects the flexure of the slab by spraying high pressure cooling water to the upper surface or the lower surface of the slab according to flexure information from the flexure sensor.

The flexure correction device may include an upper high pressure water spraying nozzle located above the slab and a lower high pressure water spraying nozzle located below the slab.

The upper nozzle unit, the lower nozzle unit, and the movement apparatus may be disposed on each side of the slab, and at least one of the upper nozzle unit and the lower nozzle unit may selectively operate to selectively scarf at least one of four corner portions of the slab.

Another aspect of the present invention provides a slab scarfing apparatus including at least one nozzle which scarfs a corner portion of a slab. Herein, the nozzle may include a base portion and an outlet cartridge mounted on the base portion to form an injection hole of a gas for scarfing while being partially detachably mounted on the base portion to change a shape of the injection hole.

The outlet cartridge may include a first block which is mounted on the base portion and defines at least one side of the injection hole, a second block which defines another side of the injection hole, and a third block which is mounted on the base portion while being in contact with the second block and the first block and defines the rest of the injection hole.

The injection hole may have a trapezoidal cross section.

The injection hole may have a rectangular cross section.

The injection hole may have a triangular cross section.

The injection hole may include a first internal angle which is a right angle formed by the first block in contact with the third block, a second internal angle which is a right angle formed by the second block in contact with the third block, a third internal angle which is an acute angle formed by the first block in contact with the second block, and a fourth internal angle which is an obtuse angle formed by the second block.

The injection hole may include a first internal angle which is a right angle formed by the first block in contact with the third block, a second internal angle which is an acute formed by the second block in contact with the third block, and a third internal angle which is an acute angle formed by the first block in contact with the second block.

Still another aspect of the present invention provides a method of controlling a slab scarfing apparatus. The method includes correcting a posture of a slab using a correction device on a transfer path before a scarfing area, sensing a position of a fore end of the slab which enters the scarfing area after correcting the posture of the slab and initializing a number of revolutions of a pinch roll while clamping the slab using the pinch roll, transferring the slab by operating the pinch roll until a corner of the fore end of the slab arrives at the scarfing area and then moving a plurality of nozzle units which scarf a corner of the slab to a scarfing position, and scarfing the slab after moving the plurality of nozzle units to the scarfing position.

Whether the slab is eccentric may be determined by measuring a width of the slab using a width measuring sensor installed on the transfer path after correcting the posture of the slab using the correction device, and when it is determined that the slab transferred to the scarfing area is eccentric, the correcting of the posture of the slab using the correction device may be performed again.

When the slab is transferred using the pinch roll, a transfer distance of the slab may be determined based on the number of revolutions of the pinch roll.

The method may include determining whether the positions of the plurality of nozzle units are appropriate by sensing positions of the plurality of nozzle units using a nozzle position sensor while moving the plurality of nozzle units to the scarfing position and separating and returning the plurality of nozzle units from the slab to original positions and performing the correcting of the posture of the slab using the correction device again when it is determined that the positions of the plurality of nozzle units are not appropriate.

Yet another aspect of the present invention provides a method of controlling a slab scarfing apparatus which includes a plurality of nozzle units which scarf a corner portion of a slab and a cooling system cooling the plurality of nozzle units using cooling water. Herein, the method includes determining whether a flow of the cooling water discharged through the plurality of nozzle units is adequate by sensing the cooling water using a fluid flow sensor and stopping an operation when it is determined that the flow of the cooling water is inadequate.

Even another aspect of the present invention provides a method of controlling a slab scarfing apparatus which includes a plurality of nozzle units which scarf a corner portion of a moving slab and a cooling system cooling the plurality of nozzle units using cooling water. Herein, the method includes determining whether cooling of the cooling water discharged through the plurality of nozzle units is adequate by sensing a temperature of the cooling water using a temperature sensor and stopping an operation when it is determined that the cooling of the cooling water is inadequate.

Advantageous Effects

A slab scarfing apparatus in accordance with one embodiment of the present invention may scarf four corner portions of a slab at the same time while the slab is being transferred and may select and scarf at least one of the four corner portions of the slab as necessary.

A slab scarfing apparatus in accordance with one embodiment of the present invention may supply a slab in a corrected posture to a scarfing area and may perform scarfing while nozzle units are accurately located in a scarfing position, thereby embodying stable scarfing of the slab.

A slab scarfing apparatus in accordance with one embodiment of the present invention may include a first side nozzle provided on an upper nozzle unit to move together with an upper surface nozzle and a second side nozzle provided on a lower nozzle unit to move together with a lower surface nozzle, thereby embodying scarfing without replacing or changing the upper nozzle unit and lower nozzle unit even when a thickness of a slab to be inserted changes.

A slab scarfing apparatus in accordance with one embodiment of the present invention may change a shape of an injection hole by replacing only an outlet cartridge of a nozzle, thereby easily changing a scarfing shape of a corner portion of a slab according to a steel grade or scarfing conditions without replacing the whole nozzle.

A slab scarfing apparatus in accordance with one embodiment of the present invention may have a structure in which a guide unit which maintains a gap between a slab and a nozzle while being in contact with an upper surface of the slab protrudes in a direction in which the slab enters rather than the nozzle, thereby allowing the guide unit to be in contact with and supported by the upper surface of the slab with a fore end of the slab having arrived at a scarfing position. Accordingly, it is possible to scarfing from a fore end of a corner portion of the slab to a rear end thereof (the entire area of the corner portion).

A slab scarfing apparatus in accordance with one embodiment of the present invention may replace a spacer between an upper nozzle unit and a lower nozzle unit when a thickness of a slab changes, thereby easily adjusting a gap between the upper nozzle unit and the lower nozzle unit corresponding to the change in thickness of the slab.

MODE FOR INVENTION

Hereinafter, embodiments of the present invention will be described in detail with reference to the drawings. The following embodiments are provided for fully conveying the concept of the present invention to one of ordinary skill in the art and are not limited to the herein provided, but may be specified in other forms. Throughout the drawings, for clarity, parts irrelevant to a description will be omitted, and sizes of components may be slightly exaggerated for better understanding.

Figure 1:
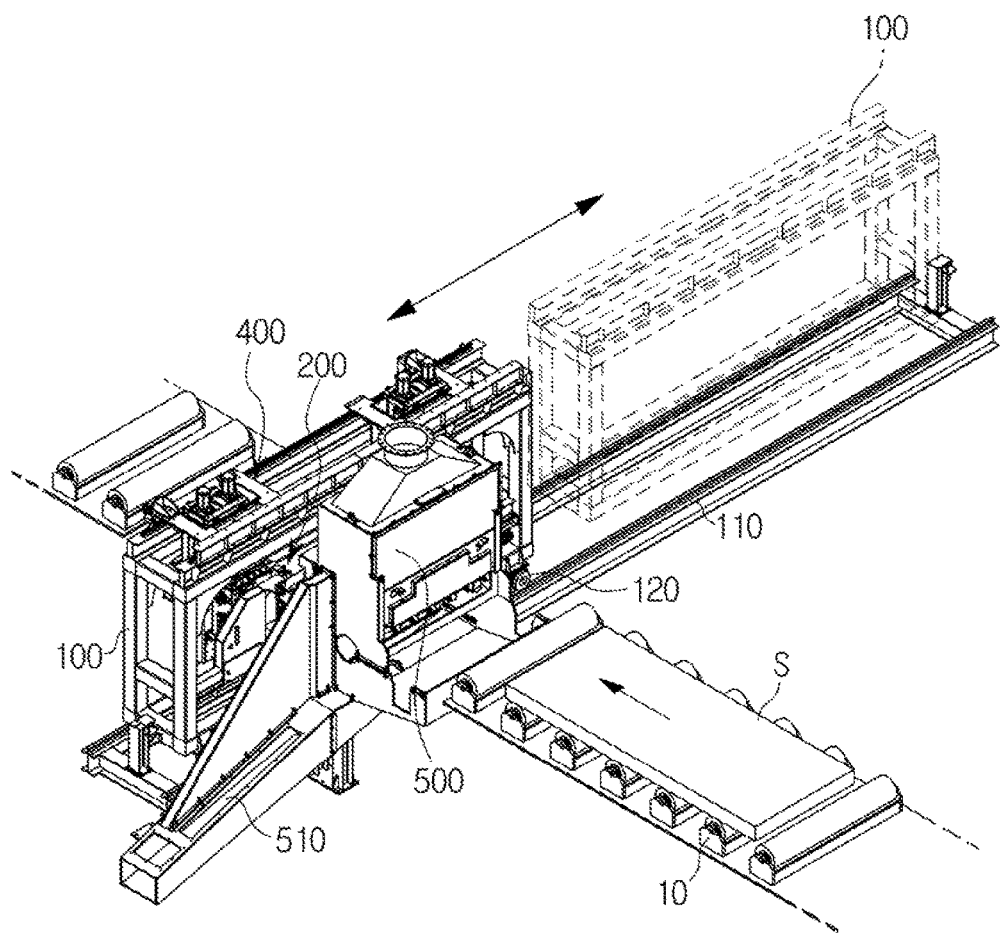
FIG. 1 is a perspective view illustrating an overall constitution of a slab scarfing apparatus in accordance with one embodiment of the present invention.

FIG. 1 illustrates an overall constitution of a slab scarfing apparatus in accordance with one embodiment of the present invention. As shown in the drawing, the slab scarfing apparatus may simultaneously scarf four corner portions of a slab S installed on a transfer line 10 including a roller table, etc. on which the slab S produced in a continuous casting process, etc. is transferred. Needless to say, it is also possible to select and scarf at least one of the four corner portions of a slab.

Figure 2:
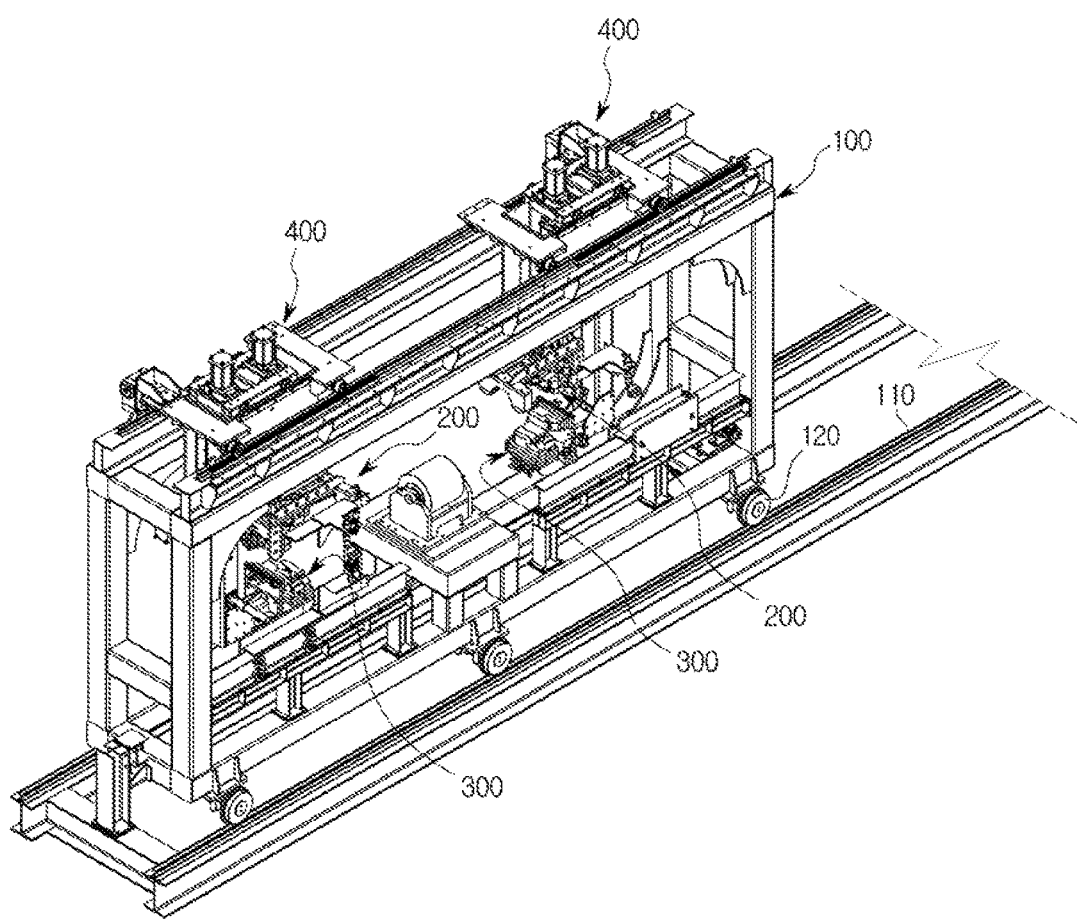
FIG. 2 is a perspective view illustrating a frame of the slab scarfing apparatus and devices mounted thereon in accordance with one embodiment of the present invention.

Referring to FIGS. 1 and 2, the slab scarfing apparatus includes a frame 100 movable in a direction intersecting the transfer line 10 with apparatuses for scarfing mounted thereon, a driving rail installed on the floor of a factory, etc. to guide movement of the frame 100, and a frame driving portion 120 which moves the frame 100. The frame 100 may move to a scarfing area of the transfer line 10 along the driving rail 110 by an operation of the frame driving portion 120 or may move out of the scarfing area to a standby area on a side of the transfer line 10. In the standby area, inspections or maintenance for slab scarfing apparatus may be performed.

Figure 3:
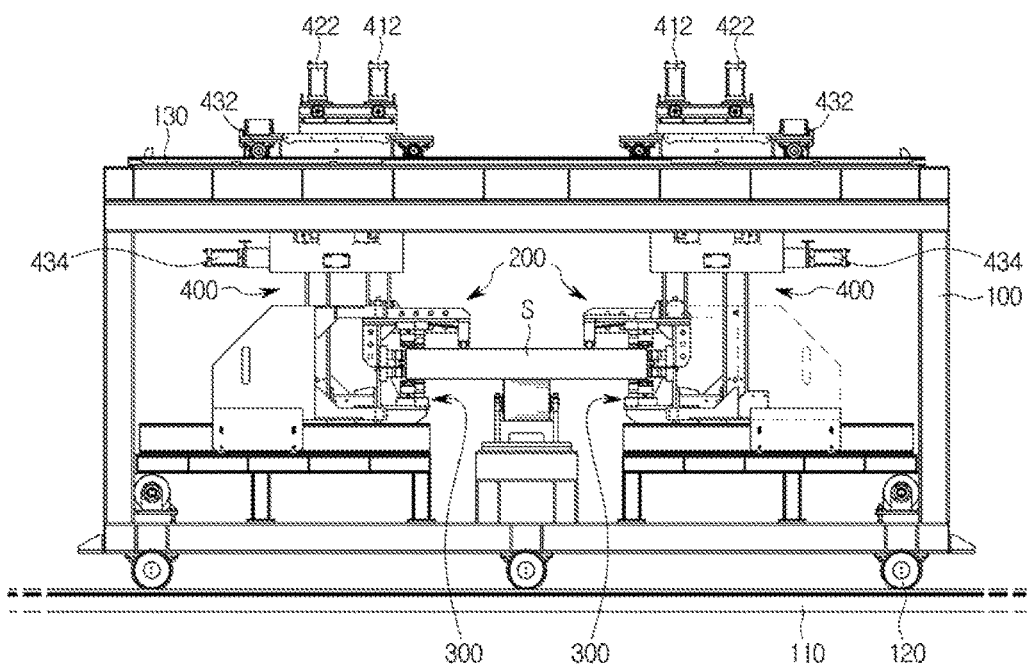
FIG. 3 is a front view illustrating the frame of the slab scarfing apparatus and devices mounted thereon in accordance with one embodiment of the present invention.

Referring to FIGS. 2 and 3, the slab scarfing apparatus includes an upper nozzle unit 200 for scarfing an upper corner portion of the slab S, a lower nozzle unit 300 for scarfing a lower corner portion of the slab S, and a movement apparatus 400 which moves the upper nozzle unit 200 and the lower nozzle unit 300 closer to or away from a corner portion of the slab S.

The movement apparatus 400 may each be provided on each side of the frame 100, and the upper nozzle unit 200 and the lower nozzle unit 300 may also each be installed on movement apparatuses 400 on both sides. That is, a pair of the upper nozzle unit 200, a pair of the lower nozzle unit 300, and a pair of the movement apparatuses 400 are provided on both sides of the slab S, each pair in an identical form. Accordingly, the slab scarfing apparatus according to the embodiment may scarf four corner portions of the slab S at the same time while transferring the slab S, or at least one of the upper nozzle unit 200 and the lower nozzle unit 300 may also be selectively operated to selectively scarf at least one of four corner portions of the slab S.

Figure 4:
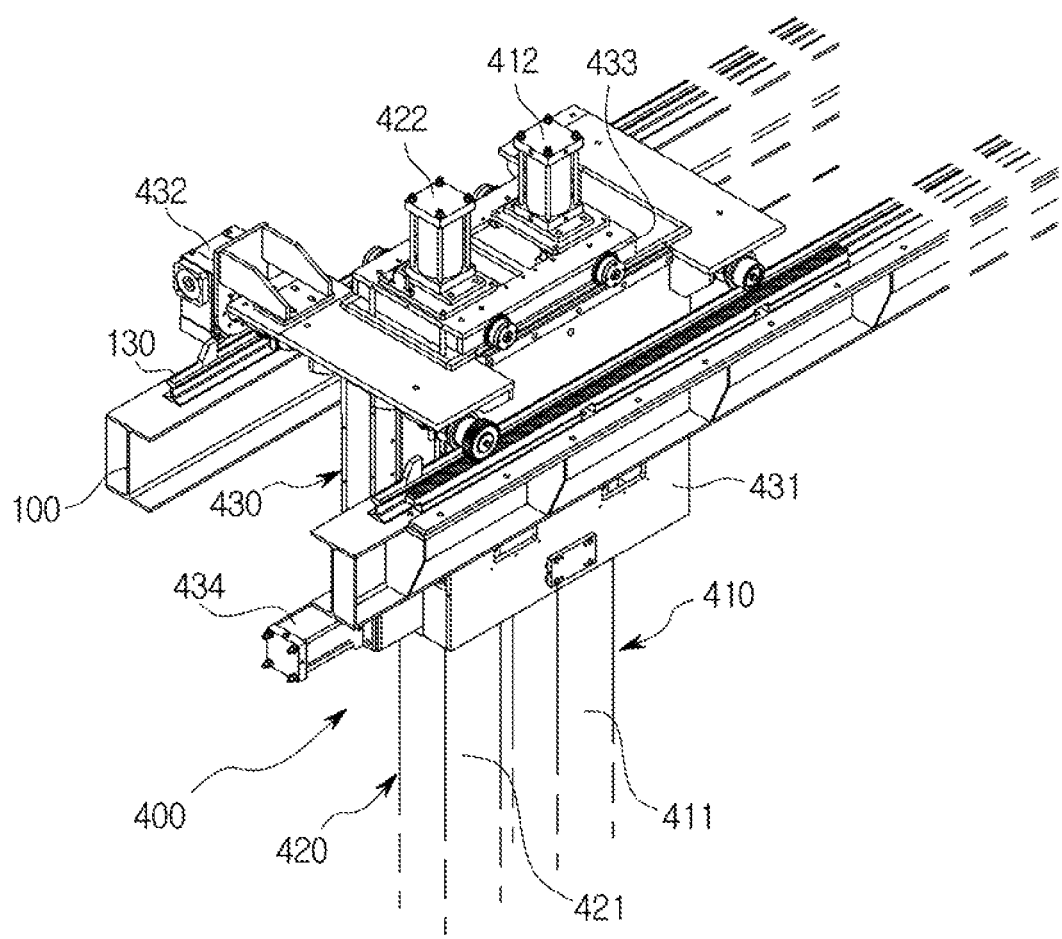
FIG. 4 is a perspective view of a movement apparatus of the slab scarfing apparatus in accordance with one embodiment of the present invention.
Figure 5:
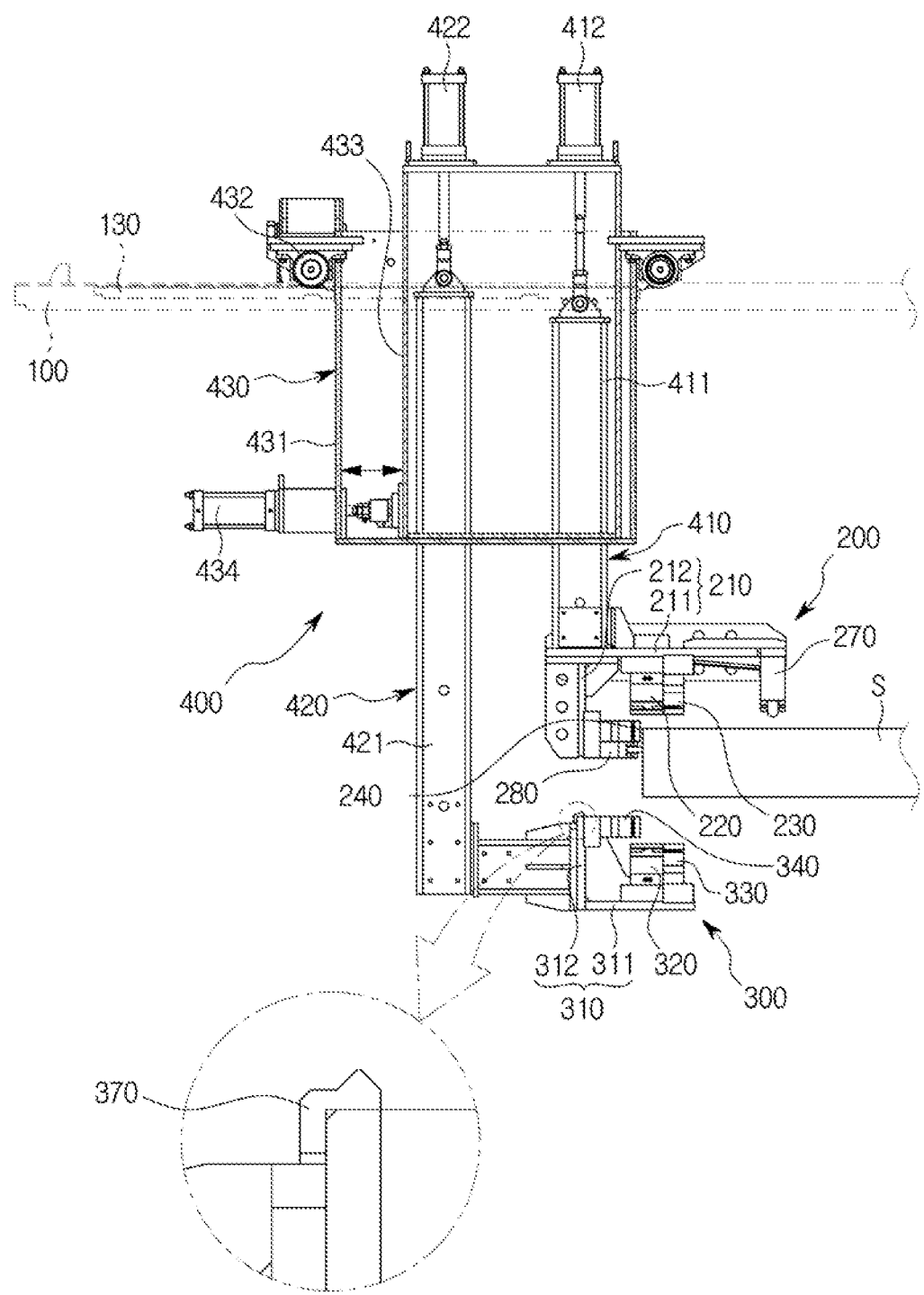
FIG. 5 is a side view illustrating the movement apparatus, an upper nozzle unit, and a lower nozzle unit of the slab scarfing apparatus in accordance with one embodiment of the present invention.

Referring to FIGS. 4 and 5, the movement apparatus 400 includes a first vertical movement portion 410 which vertically moves the upper nozzle unit 200, a second vertical movement portion 420 which vertically moves the lower nozzle unit 300, and a laterally moving portion 430 which laterally moves while supporting the first vertical movement portion 410 and the second vertical movement portion 420.

The laterally moving portion 430 may include a first moving body 431 in a box shape movably supported by the frame 100 in a lateral direction, a first lateral driving portion 432 which relatively moves the first moving body 431 in the lateral direction with respect to the frame 100, a second moving body 433 movably supported by the first moving body 431 in the lateral direction, and a second lateral driving portion 434 which relatively moves the second moving body 433 in the lateral direction with respect to the first moving body 431. The first lateral driving portion 432 may include a driving means such as a roller, a pinion gear, a rack gear, a driving motor, etc. which allows the first moving body 431 to move along a rail 130 above the frame 100. The second lateral driving portion 434 may include a hydraulic pressure cylinder, etc. which pushes or pulls the second moving body 433 to move in the lateral direction while being fixed to the first moving body 431.

The first vertical movement portion 410 includes a first elevating member 411 elevatably supported by the second moving body 433 and a first elevation driving portion 412 which vertically moves the first elevating member 411. The second vertical movement portion 420 includes a second elevating member 421 elevatably supported by the second moving body 433 and a second elevation driving portion 422 which vertically moves the second elevating member 421.

Referring to FIG. 5, the first elevating member 411 and the second elevating member 421 are installed to vertically elevate parallel to each other while being spaced apart, and the upper nozzle unit 200 and the lower nozzle unit 300 are coupled with each lower portion thereof. The first elevation driving portion 412 may vertically move the upper nozzle unit 200 by vertically moving the first elevating member 411 while being mounted above the second moving body 433. The second elevation driving portion 422 may also vertically move the lower nozzle unit 300 by vertically moving the second elevating member 421 while being mounted above the second moving body 433. The first elevation driving portion 412 and the second elevation driving portion 422 may be formed of hydraulic cylinders, etc.

Figure 7:
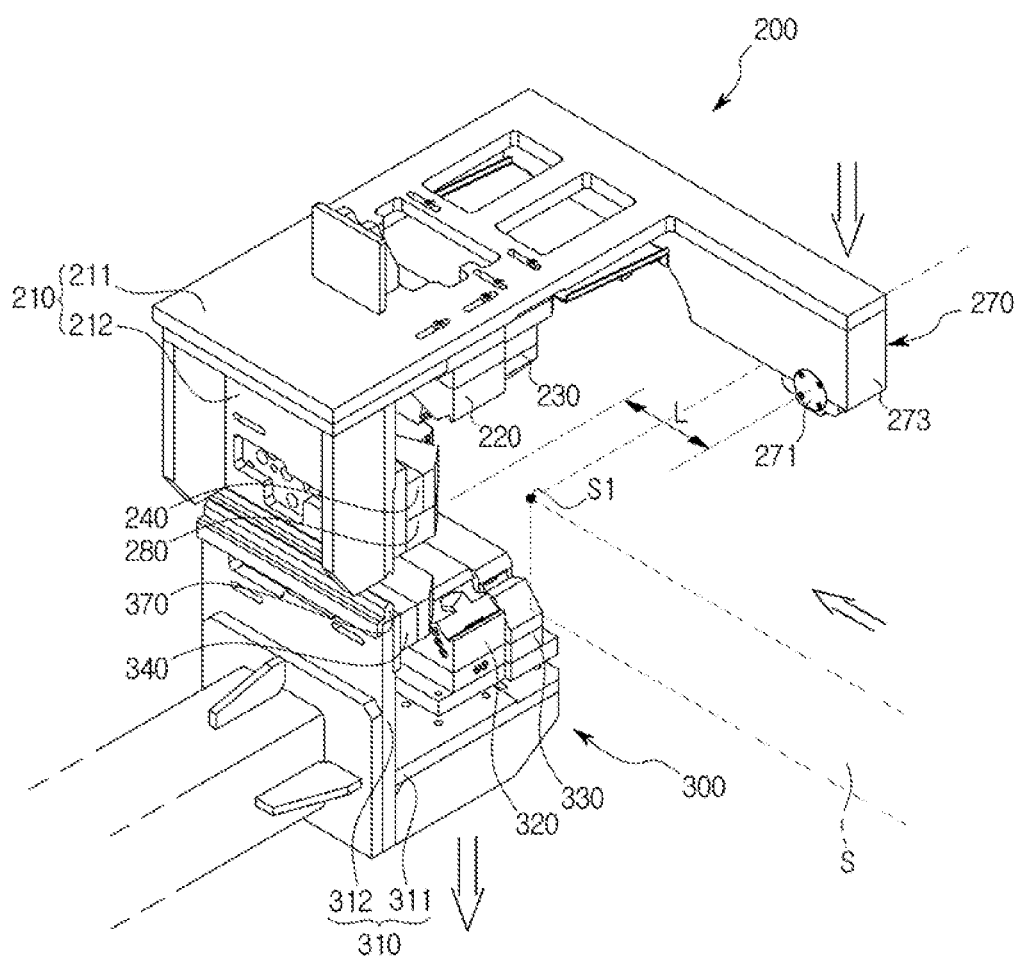
FIG. 7 is a perspective view illustrating the upper nozzle unit and the lower nozzle unit of the slab scarfing apparatus in accordance with one embodiment of the present invention.

Referring to FIGS. 5 and 7, the upper nozzle unit 200 includes an upper nozzle frame 210 which includes a horizontal supporting portion 211 and a vertical supporting portion 212 and is coupled with the first elevating member 411, an upper surface nozzle 220 which is mounted on the horizontal supporting portion 211 of the upper nozzle frame 210 and scarfs a corner portion of an upper surface of the slab S, and a first side nozzle 240 which is mounted on the vertical supporting portion 212 of the upper nozzle frame 210 and scarfs an upper corner portion of a side of the slab S. The upper surface nozzle 220 and the first side nozzle 240 are coupled with the upper nozzle frame 210, thereby moving together due to an operation of the first elevating member 411.

The lower nozzle unit 300 includes a lower nozzle frame 310 which includes a horizontal supporting portion 311 and a vertical supporting portion 312 and is coupled with the second elevating member 421, a lower surface nozzle 320 which is mounted on the horizontal supporting portion 311 of the lower nozzle frame 310 and scarfs a corner portion of a lower surface of the slab S, and a second side nozzle 340 which is mounted on the vertical supporting portion 312 of the lower nozzle frame 310 and scarfs a lower corner portion of the side of the slab S. The lower surface nozzle 320 and the second side nozzle 340 are coupled with the lower nozzle frame 310, thereby moving together due to an operation of the second elevating member 421.

Referring to FIGS. 9 to 12, the upper surface nozzle 220 has a block shape and includes a preheating gas injection hole 221 and a scarfing gas injection hole 222 provided in a direction in which the slab S comes in to perform scarfing of the upper corner portion of the slab S.

Figure 10:
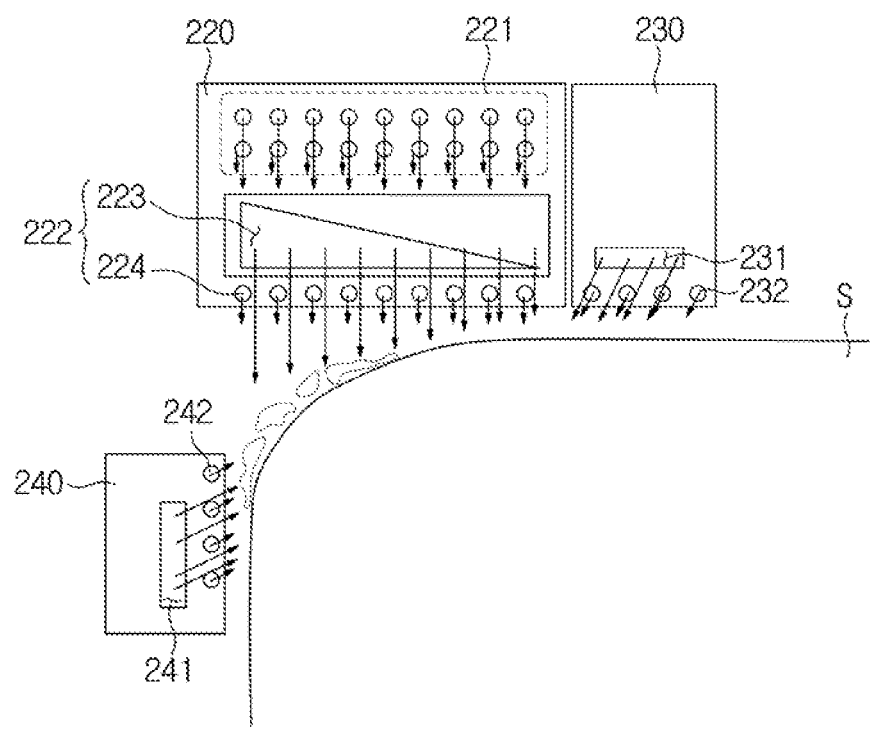
FIG. 10 illustrates injection holes of the upper surface nozzle, the auxiliary upper surface nozzle, and the first side nozzle of the slab scarfing apparatus in accordance with one embodiment of the present invention and a shape of a slab corner portion to be scarfed.
Figure 12:
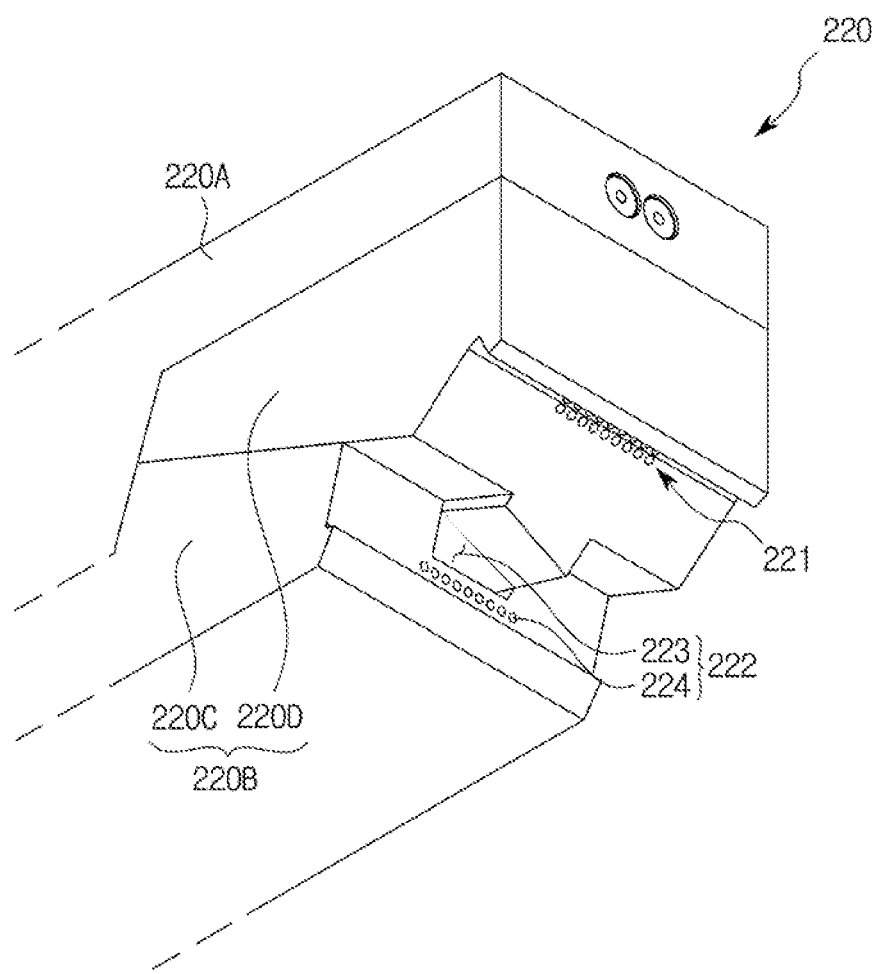
FIG. 12 is a perspective view of a preheating gas injection hole and a scarfing gas injection hole provided on the slab scarfing apparatus in accordance with one embodiment of the present invention.

Referring to FIGS. 10 and 12, the preheating gas injection hole 221 forms flames for preheating and melting a corner of the upper surface of the slab S and includes a plurality of injection holes which inject a preheating gas. The preheating gas includes a fuel gas and oxygen for preheating combustion. The plurality of injection holes may be divided into injection holes for injecting the fuel gas for preheating and injection holes for injecting the oxygen for preheating combustion.

The scarfing gas injection hole 222 may include an oxygen injection hole 223 which injects high pressure oxygen to a preheated portion of the slab S to embody scarfing and a fuel gas injection hole 224 which heats the oxygen injected from the oxygen injection hole 223 and guides an injection direction of the oxygen. The high pressure oxygen injected from the oxygen injection hole 223 facilitates oxidation heat of the preheated portion to embody substantial scarfing.

The fuel gas injected by the fuel gas injection hole 224 heats the injected oxygen and guides the injection direction to reduce an effect of low temperature oxygen injected by the oxygen injection hole 223 on the slab S. The fuel gas injection hole 224 described above may be disposed closer to the slab S than the oxygen injection hole 223. In the embodiment, an example in which the scarfing gas injection hole 222 includes the fuel gas injection hole 224 to embody better scarfing is described. However, since the fuel gas injection hole 224 is not indispensable, it is possible to exclude the fuel gas injection hole 224 from the constitution of the scarfing gas injection hole 222.

The oxygen injection hole 223, as shown in FIG. 10, may be formed lengthwise in a width direction of the slab S and may have a shape with a flow channel width gradually becoming larger as getting closer to the corner of the slab S. Like an example shown in FIG. 10, a cross section of an outlet of the oxygen injection hole 223 is approximately formed in a triangle, thereby allowing scarfing of the corner of the slab S to be large.

Figure 9:
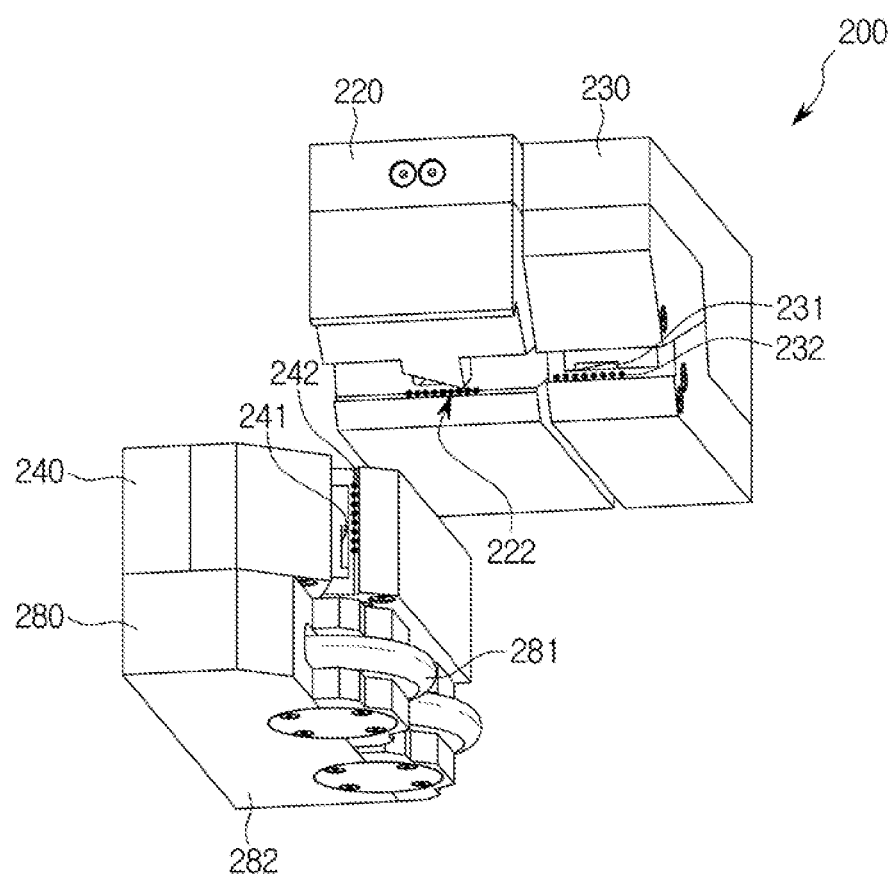
FIG. 9 is a perspective view illustrating an upper surface nozzle, an auxiliary upper surface nozzle, a first side nozzle, and a lateral pressure guide unit mounted on the upper nozzle unit of the slab scarfing apparatus in accordance with one embodiment of the present invention.

The first side nozzle 240, as shown in FIGS. 9 and 10, includes an oxygen injection hole 241 which injects oxygen to the upper corner portion of the side of the slab S for scarfing and a fuel gas injection hole 242 which heats the oxygen injected by the oxygen injection hole 241 and guides the injection. Together with the upper surface nozzle 220, the first side nozzle 240 prevents melted slag from being welded onto the side of the slab S and fixed thereto as a buildup while embodying scarfing of the upper corner portion of the side of the slab S.

Also, the upper nozzle unit 200 includes an auxiliary upper nozzle 230 which is disposed on a side of the upper surface nozzle 220 and includes an oxygen injection hole 231 which injects oxygen to an area scarfed by the upper surface nozzle 220 and a fuel gas injection hole 232 which heats the oxygen injected by the oxygen injection hole 231 and guides the injection. The auxiliary upper nozzle 230, like the first side nozzle 240, prevents melted slag from being welded on the upper surface of the slab S and fixed thereto as a buildup.

Figure 11:
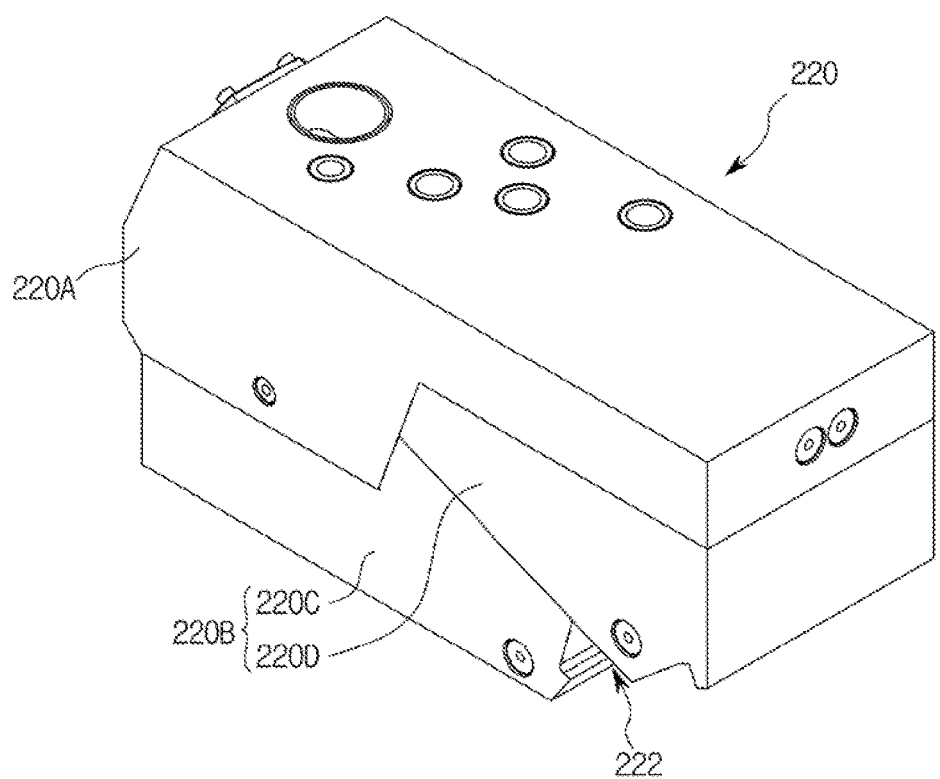
FIG. 11 is a perspective view illustrating the upper surface nozzle of the slab scarfing apparatus in accordance with one embodiment of the present invention.
Figure 13:
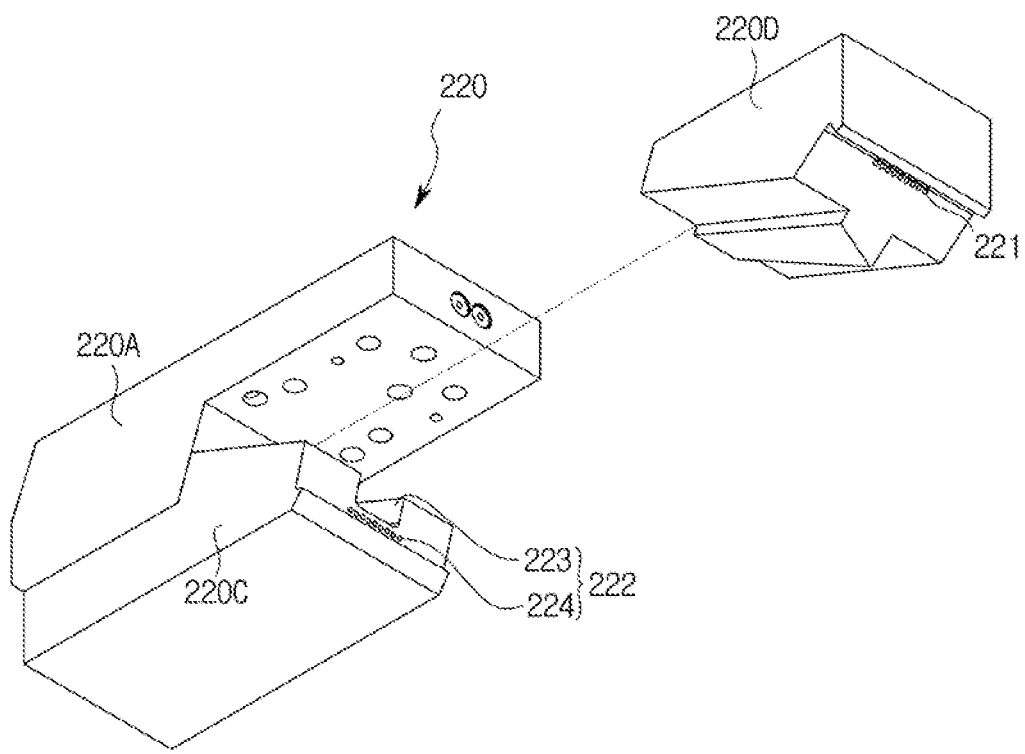
FIG. 13 is an exploded perspective view illustrating the upper surface nozzle of the slab scarfing apparatus in accordance with one embodiment of the present invention.

Referring to FIGS. 11 to 13, the upper surface nozzle 220 includes an outlet cartridge 220B formed of a plurality of partially separable blocks to easily change a shape of the oxygen injection hole 223. That is, the upper surface nozzle 220 includes a base portion 220A fixed to the upper nozzle frame 210 and the outlet cartridge 220B formed of a first block 220C and a second block 220D mounted on the base portion 220A. Accordingly, when changing the scarfing shape, the shape of the oxygen injection hole 223 may be easily changed by replacing at least one of the first block 220C and the second block 220D instead of replacing the whole upper surface nozzle 220.

Figure 14:
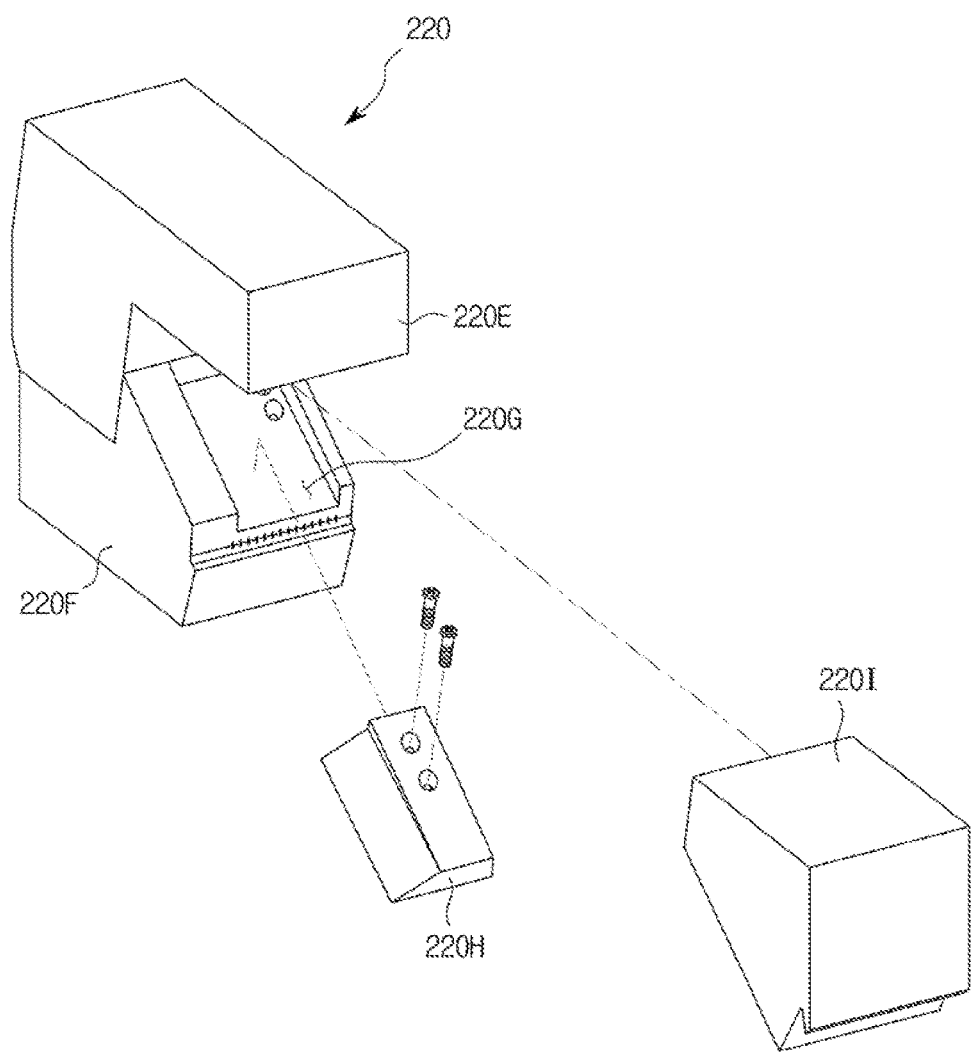
FIG. 14 is an exploded perspective view illustrating a modified example of the upper surface nozzle of the slab scarfing apparatus in accordance with one embodiment of the present invention.

FIG. 14 illustrates a modified example of an outlet cartridge of the upper surface nozzle 220. In FIG. 14, the upper surface nozzle 220 may include a base portion 220E, a first block 220F mounted on the base portion 220E and defining at least one side of the oxygen injection hole 223, a second block 220H coupled with a mounting groove 220G of the first block 220F and defining another side of the oxygen injection hole 223, and a third block 220I mounted on the base portion 220E while being in contact with the second block 220H and the first block 220F and defining the rest of the oxygen injection hole 223. This is to easily change the shape of the oxygen injection hole 223 by partially replacing the second block 220H and to easily change a scarfing shape of the slab S thereby.

Figure 15A:
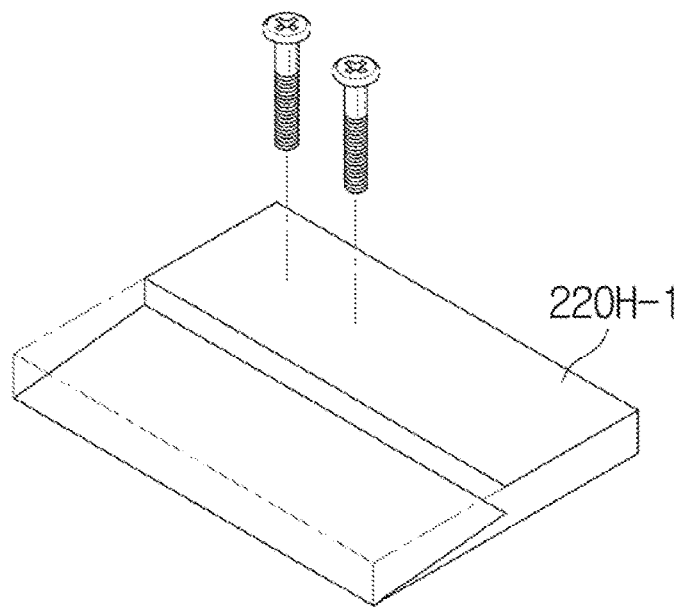
FIGS. 15a to 15c illustrate various examples of a second block interchangeably mounted on the upper surface nozzle of FIG. 14 to change an oxygen injection hole.
Figure 15B:
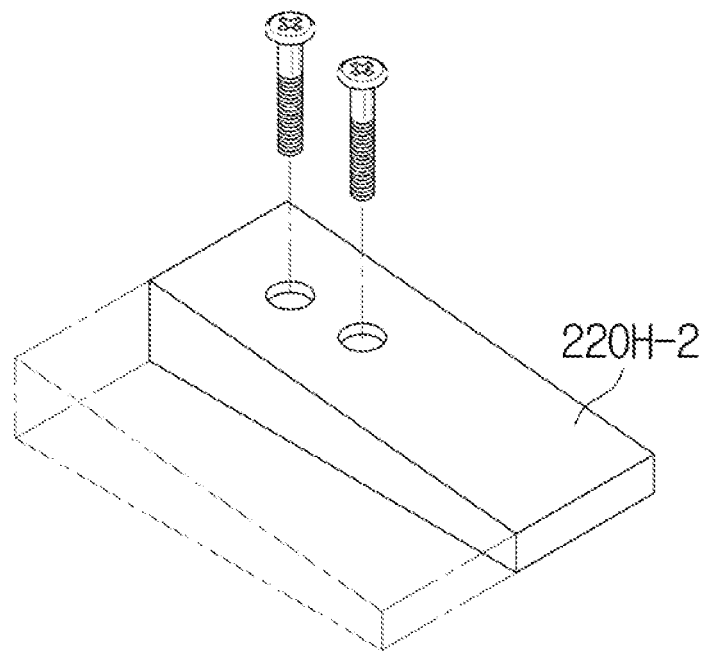
Figure 15C:
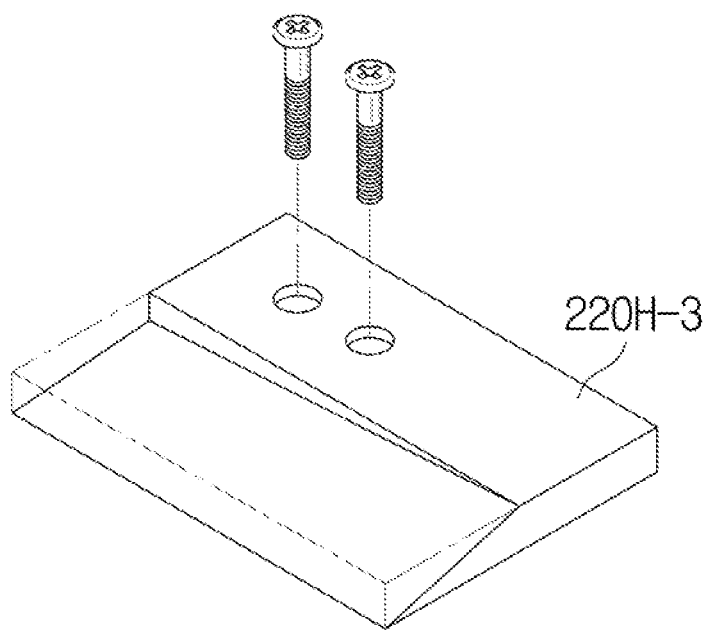

FIGS. 15a to 15c illustrate examples of various second blocks 220H-1, 220H-2, and 220H-3 interchangeable to change the oxygen injection hole 223. Also, FIGS. 16a to 16c illustrate examples of the oxygen injection hole 223 and the corner portion of the slab S changing according to the interchanged second blocks 220H-1, 220H-2, and 220H-3 as described above.

Figure 16A:
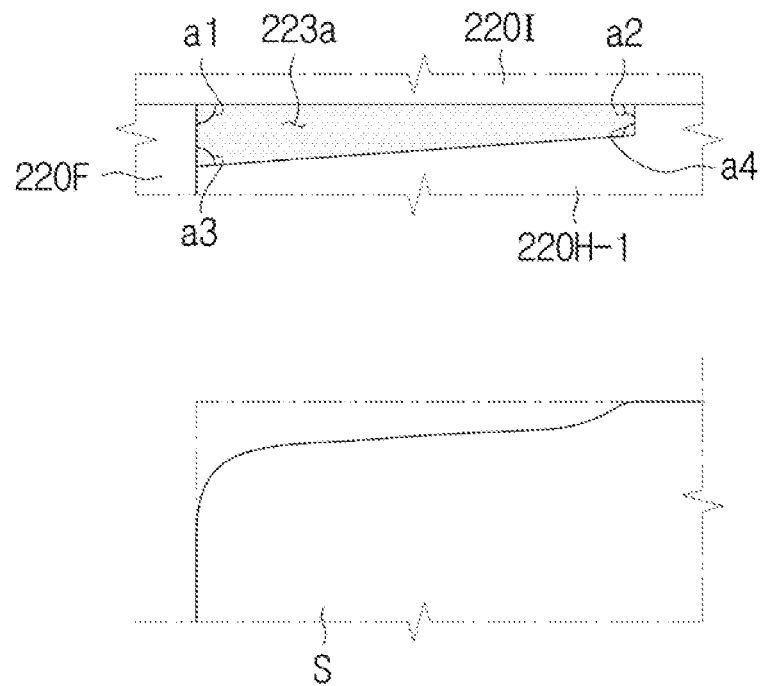
FIGS. 16a to 16c illustrate examples of the oxygen injection hole and scarfing of the slab corner portion depending on a shape of the second block interchangeably mounted on the upper surface nozzle of FIG. 14.

FIG. 16a illustrates an oxygen injection hole 223a having a form to increase a depth and a width of scarfing of the corner portion of the slab S to produce steel plate with excellent quality. FIG. 16b illustrates an oxygen injection hole 223b having a form for thinly scarfing a surface for inspecting defects of the slab S such as minute cracks. FIG. 16c illustrates an oxygen injection hole 223c having a form for scarfing only the corner in a triangular form. In this manner, the oxygen injection holes 223a, 223b, and 223c may change shapes to adjust a scarfing amount, a scarfing depth, and a scarfing width according to purpose. As described above, the oxygen injection holes 241 and 231 formed on the first side nozzle 240 and the auxiliary upper nozzle 230 may also be changed to various shapes.

The oxygen injection hole 223a of FIG. 16a may have a first internal angle a1 formed by the first block 220F and the third block 220I in contact with each other is a right angle, a second internal angle a2 formed by the second block 220H-1 and the third block 220I in contact with each other is a right angle, a third internal angle a3 formed by the first block 220F and the second block 220H-1 in contact with each other is an acute angle, and a fourth internal angle a4 formed by the second block 220H-1 is an obtuse angle. That is, the cross sectional shape may be a trapezoid.

Figure 16B:
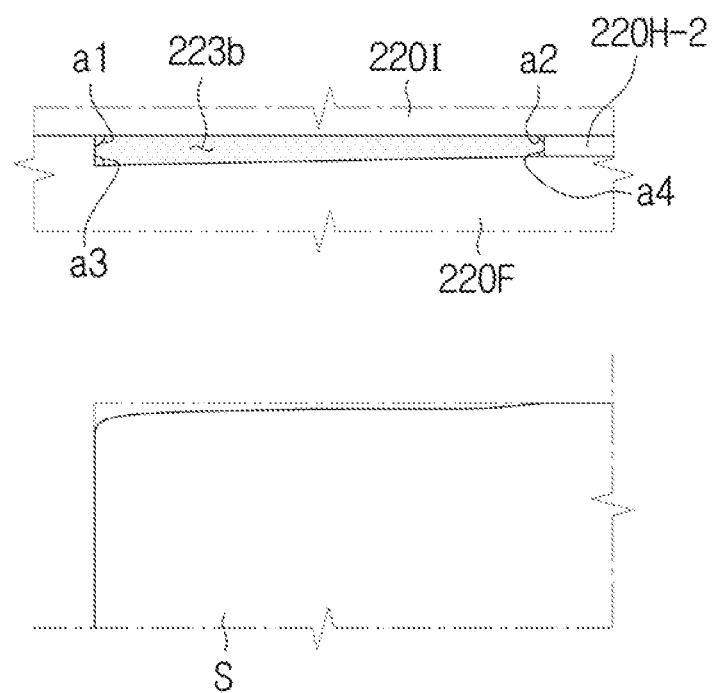
Figure 16C:
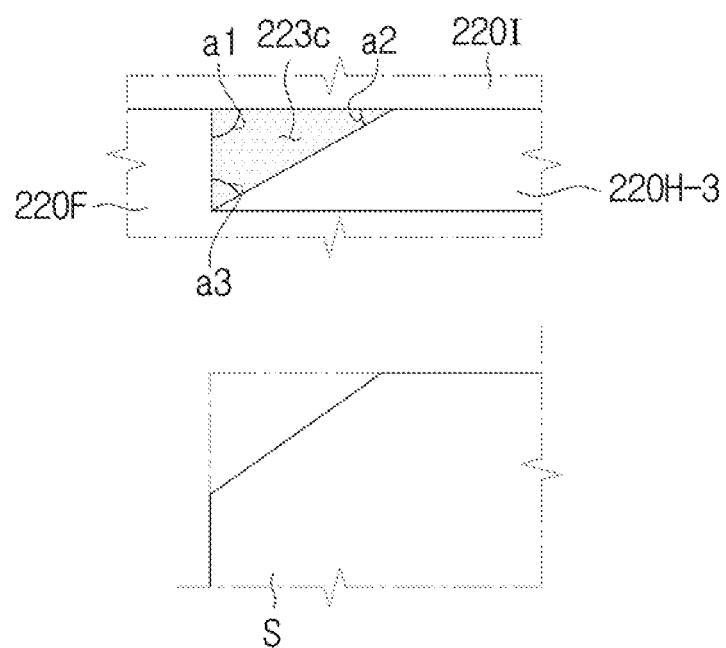

Also, the oxygen injection hole 223b of FIG. 16b may have a first internal angle a1 formed by the first block 220F and the third block 220I in contact with each other is a right angle, a second internal angle a2 formed by the second block 220H-2 and the third block 220I in contact with each other is a right angle, a third internal angle a3 formed by the second block 220H-1 is an acute angle, and a fourth internal angle a4 formed by the first block 220F and the second block 220H-2 in contact with each other is an obtuse angle.

Also, the oxygen injection hole 223c of FIG. 16c may have a first internal angle a1 formed by the first block 220F and the third block 220I in contact with each other is a right angle, a second internal angle a2 formed by the second block 220H-3 and the third block 220I in contact with each other is an acute angle, and a third internal angle a3 formed by the first block 220F and the second block 220H-3 in contact with each other is an acute angle. That is, the cross sectional shape may be a triangle. In addition, an oxygen injection hole may also have a rectangular form for which all internal angles are rectangular.

Changing an oxygen injection hole as described above may be similarly applied to the auxiliary upper nozzle 230 and the first side nozzle 240. That is, considering a scarfing shape of the slab S, the auxiliary upper nozzle 230 and the first side nozzle 240 may also change the oxygen injection holes 231 and 241 by changing only the outlet cartridges detachably coupled.

Figure 19A:
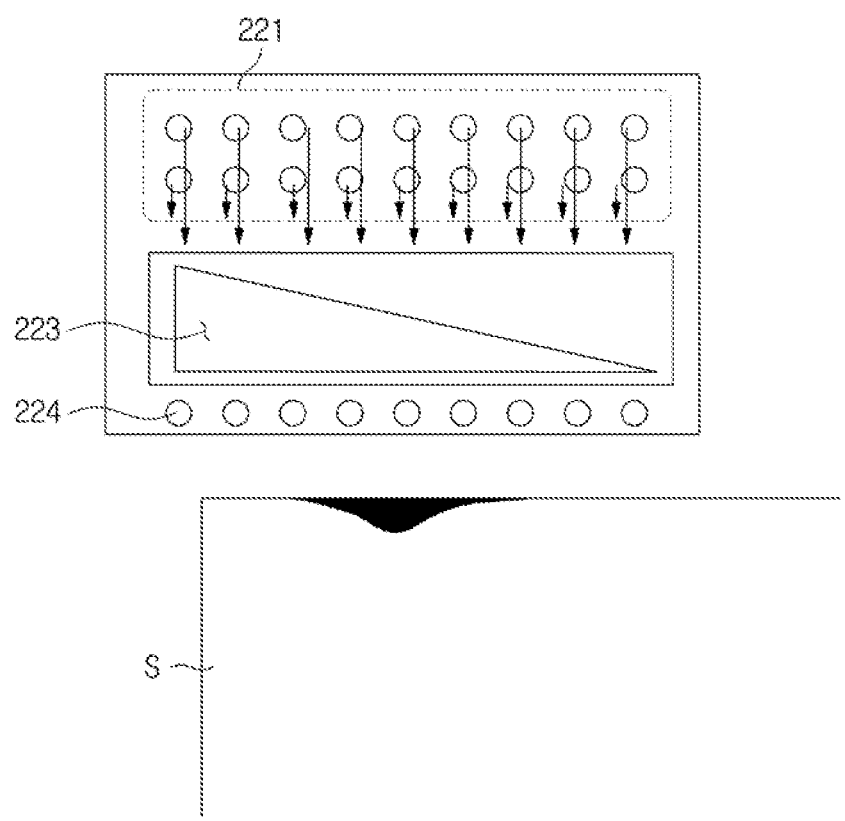
FIGS. 19a to 19c illustrate examples in which scarfing of the slab varies according to a shape of the preheated-gas injection hole provided on the upper surface nozzle of the slab scarfing apparatus in accordance with one embodiment of the present invention.

The preheating gas injection hole 221 of the upper surface nozzle 220, as shown in FIG. 10, includes a plurality of injection holes. The injection holes described above, as shown in FIG. 19a, may be provided in the same size and may be arranged at equidistant intervals in the width direction of the slab S. However, in this case, depending on the steel grade of the slab S, a portion slightly spaced from the corner may be melted before the corners of the slab S. The slab S going through the continuous casting process is generally at a high temperature. When preheating this, since the slab S may be supplied with surfaces of the corners cooler than that of a central portion, like in the example shown in FIG. 19a, a problem may arise in which the portion away from the corners is melted first.

Figure 19B:
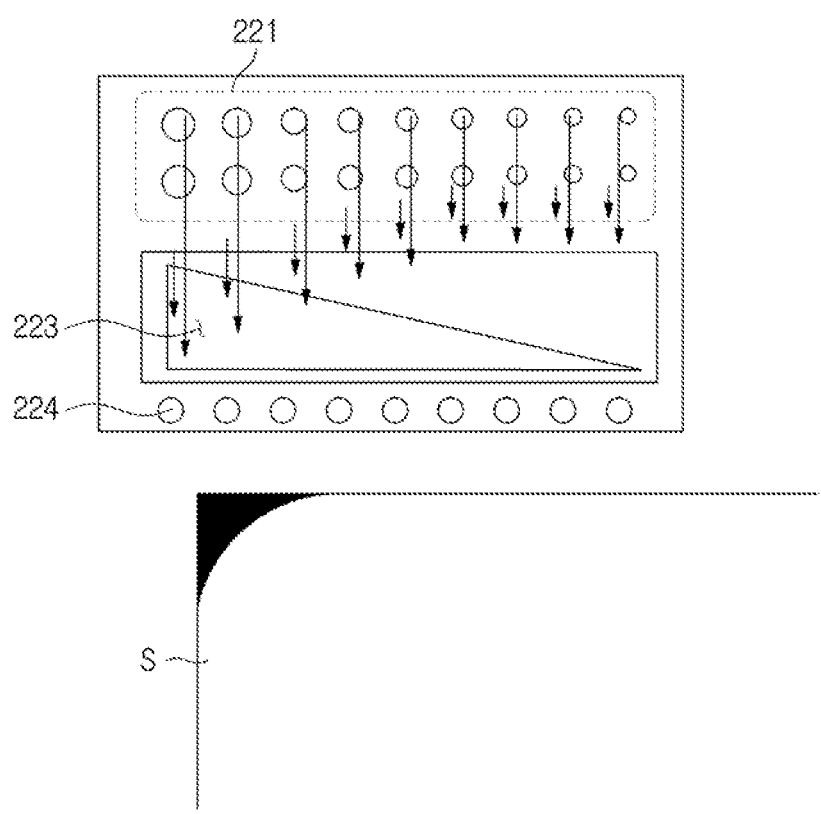
Figure 19C:
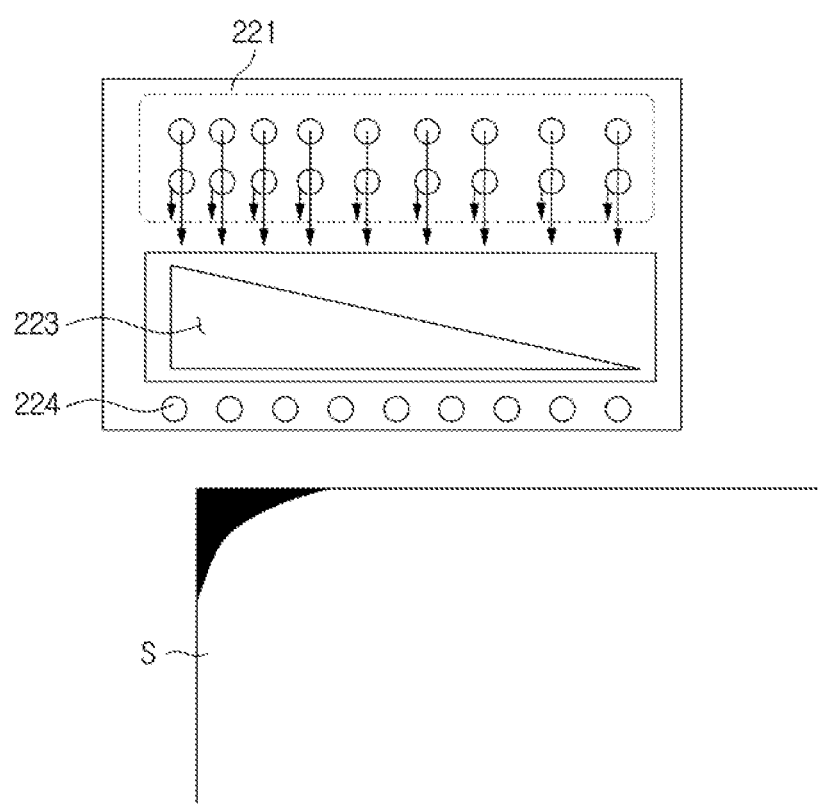

Accordingly, the preheating gas injection hole 221, like in the example shown in FIG. 19b, are preferably arranged in the width direction of the slab S mutually spaced apart with the diameter of the injection hole gradually becoming larger as getting closer to the corner from the central portion of the slab S, or like in the example shown in FIG. 19c, a separation distance between the injection holes may preferably become shorter as getting closer to the corner from the central portion of the slab S so as to be gradually densely arranged. Then, since it is possible to increase a degree of heating the corner, like the examples in FIGS. 19b and 19c, the corner of the slab S may be first melted.

Here, the upper surface nozzle 220, the auxiliary upper nozzle 230, and the first side nozzle 240 of the upper nozzle unit 200 are mainly described related to the shapes of nozzles for embodying scarfing. However, the lower surface nozzle 320, an auxiliary lower nozzle 330, and the second side nozzle 340 of the lower nozzle unit 300 provided to scarf the lower corners of the slab S may also be formed in the same way. Similarly, the upper nozzle unit 200 and the lower nozzle unit 300 disposed above and below an opposite side of the slab S may also be formed in the same way.

That is, the lower surface nozzle 320 may also be formed substantially identical to the upper surface nozzle 220. The auxiliary lower nozzle 330 may also be formed substantially identical to the auxiliary upper nozzle 230. The second side nozzle 340 may also be formed substantially identical to the first side nozzle 240.

Figure 18:
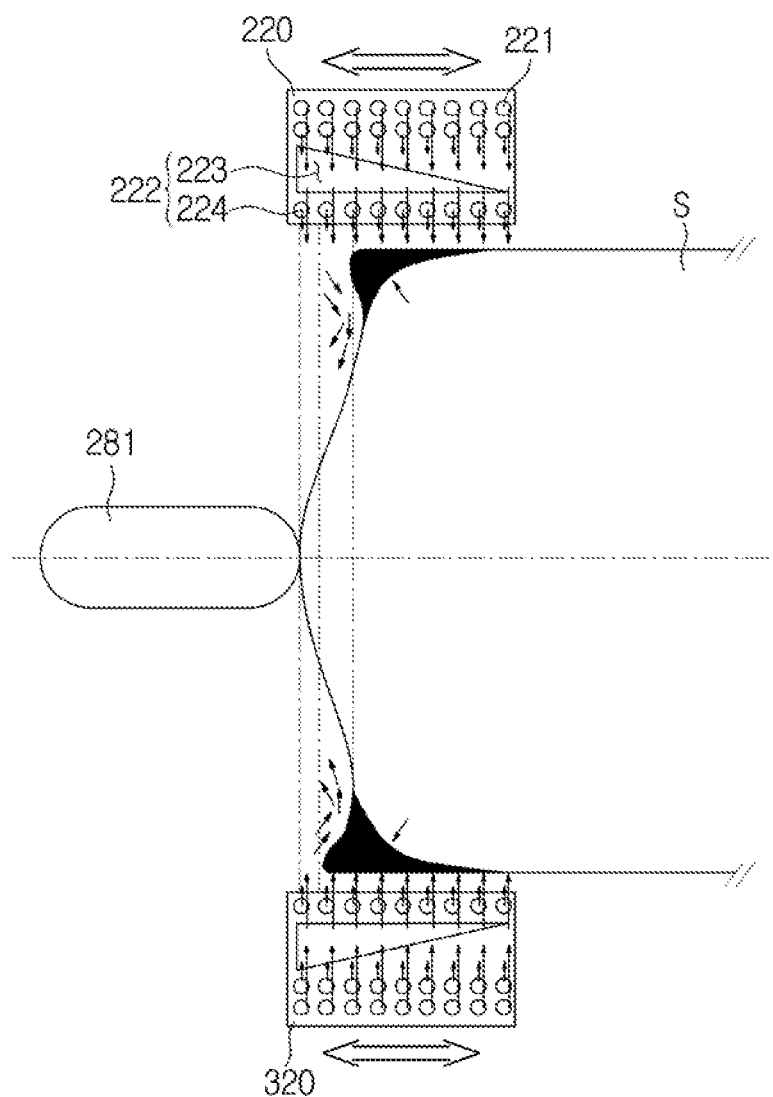
FIG. 18 illustrates the upper surface nozzle of the slab scarfing apparatus in accordance with one embodiment of the present invention and the slab corner portion scarfed by a lower surface nozzle

Referring to FIG. 18, in the case of the slab S manufactured through a continuous casting process, a bulging phenomenon may occur in which a side cannot be straightly formed due to coagulation conditions in which a middle portion of the side protrudes and an upper and lower portion adjacent to corners of the side are recessed. Such shape may vary according to the steel grade of the slab S or working conditions. Accordingly, when performing scarfing of the slab S, it is necessary to adjust a degree of scarfing for the corner by appropriately moving positions of the upper surface nozzle 220 and the lower surface nozzle 320 in the width direction of the slab S.

Figure 17:
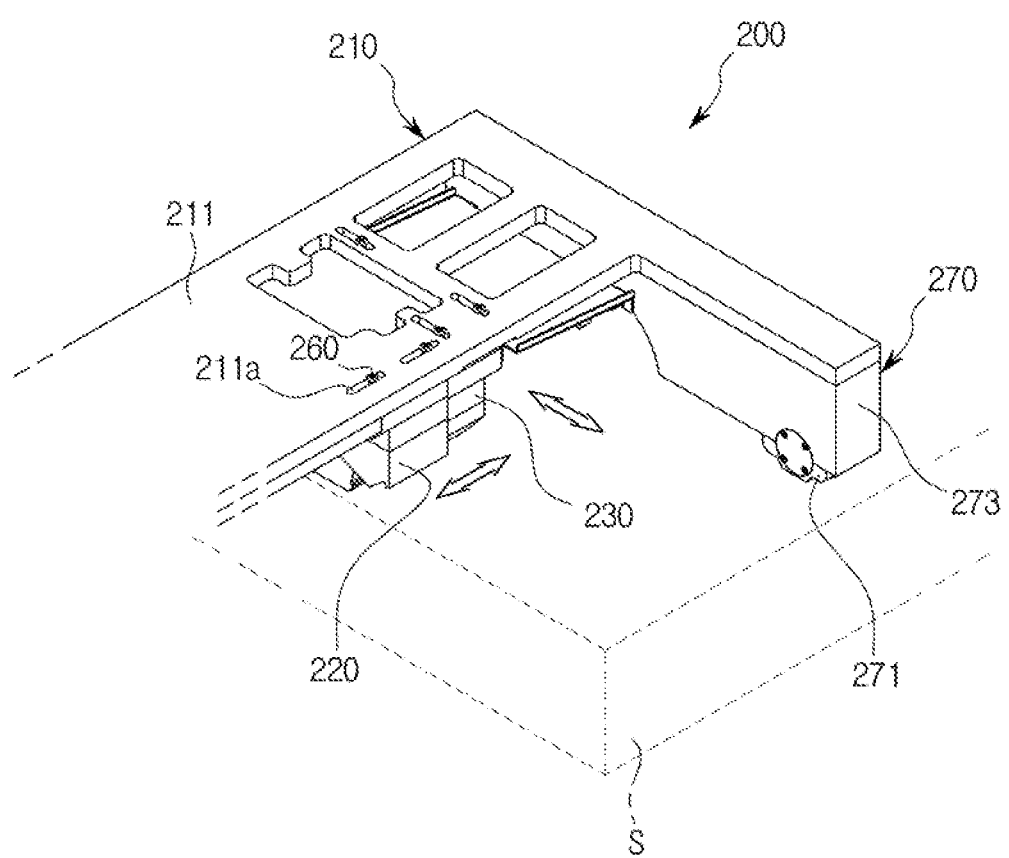
FIG. 17 illustrates an example in which the upper surface nozzle and the auxiliary upper surface nozzle are movably mounted on the upper nozzle unit of the slab scarfing apparatus in accordance with one embodiment of the present invention.

For this, the upper surface nozzle 220, as shown in FIG. 17, may be mounted on the horizontal supporting portion 211 of the upper nozzle frame 210 to be adjustable in position in the width direction of the slab S. That is, a long hole 211a with a great length in the width direction of the slab S is formed in the horizontal supporting portion 211 and a fastening bolt 260 which fixes the upper surface nozzle 220 is fixed thereto, thereby adjusting the position of the upper surface nozzle 220. In the same way, the lower surface nozzle 320 may also be mounted on the horizontal supporting portion 311 of the lower nozzle frame 310 to be adjustable in position in the width direction of the slab S.

For adjusting a gap from the upper surface nozzle 220, the first side nozzle 240 may be mounted on the vertical supporting portion 212 of the upper nozzle frame 210 to be adjustable in position in the moving direction of the slab S. For adjusting a gap from the lower surface nozzle 320, the second side nozzle 340 may be mounted on the vertical supporting portion 312 of the lower nozzle frame 310 to be adjustable in position in the moving direction of the slab S.

Figure 20:
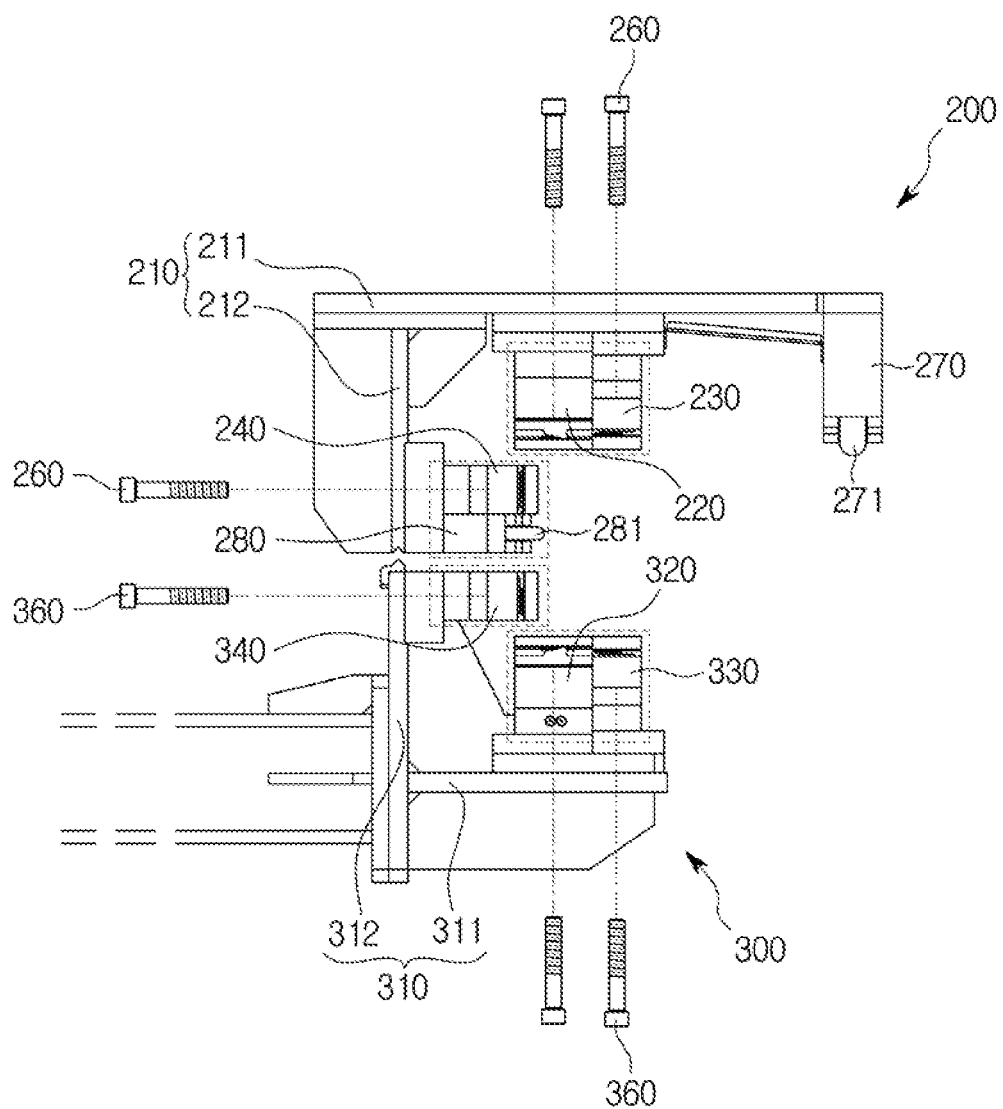
FIG. 20 illustrates an example in which nozzles of the slab scarfing apparatus in accordance with one embodiment of the present invention are mounted on the upper nozzle unit and the lower nozzle unit.

Referring to FIG. 20, the upper surface nozzle 220, the auxiliary upper nozzle 230, and the first side nozzle 240 mounted on the upper nozzle frame 210 and the lower surface nozzle 320, the auxiliary lower nozzle 330, and the second side nozzle 340 mounted on the lower nozzle frame 310 may be detachably mounted using fastening bolts 260 and 360 formed of a material with strength lower than that thereof. That is, they may be fastened by copper bolts, etc. with relatively low strength. This configuration is to minimize damage of equipment due to impacts when collisions between the slab S and nozzles occur by allowing the nozzles to be separated as the fastening bolts 260 and 360 with the relatively lower strength get damaged instead.

Referring to FIGS. 5 to 7 again, the slab scarfing apparatus includes an upper guide unit 270 which is installed in the upper nozzle unit 200 to be in contact with the upper surface of the slab S and maintains a gap between the upper surface of the slab S and the upper surface nozzle 220 and a side guide unit 280 which is installed in the upper nozzle unit 200 to be in contact with the side of the slab S and maintains a gap between the side of the slab S and the first side nozzle 240.

Figure 8:
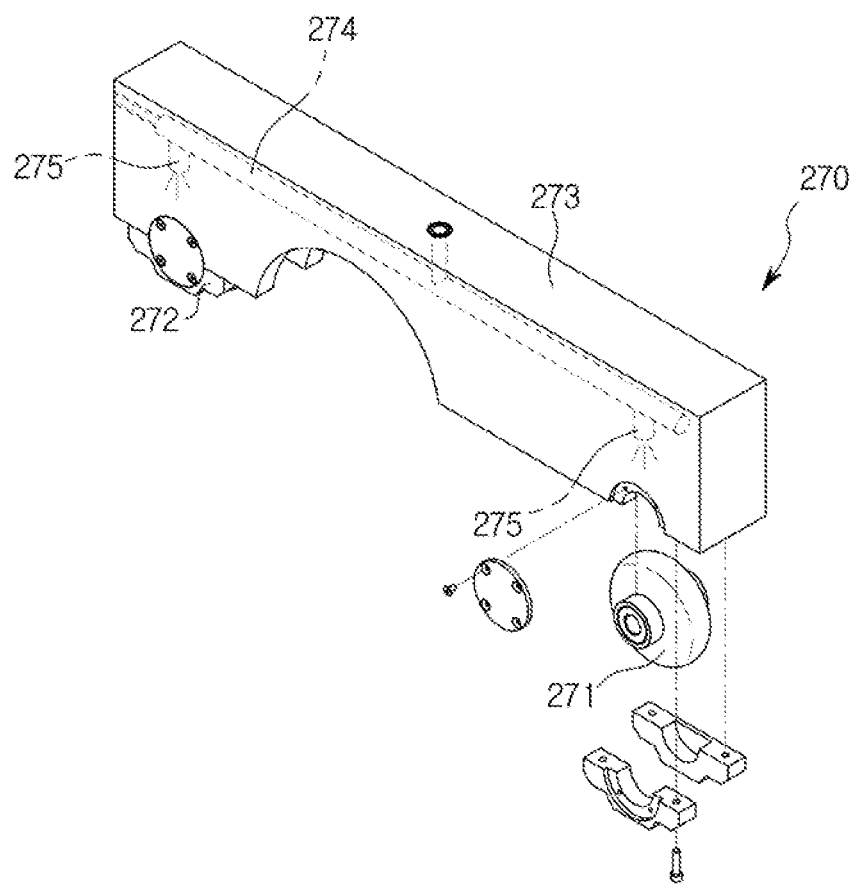
FIG. 8 is an exploded perspective view illustrating an upper guide unit of the slab scarfing apparatus in accordance with one embodiment of the present invention.

The upper guide unit 270, as shown in FIGS. 7 and 8, includes a front guide wheel 271 located in front of the injection hole of the upper surface nozzle 220 in a direction in which the slab S enters and in contact with the upper surface of the slab S, a rear guide wheel 272 located in the rear of the injection hole of the upper surface nozzle 220 in a direction in which the slab S moves and in contact with the upper surface of the slab S, and a wheel housing 273 which supports the front guide wheel 271 and the rear guide wheel 272 and is mounted on an end portion of the upper nozzle frame 210.

The front guide wheel 271 is disposed to be located ahead of the upper surface nozzle 220 by protruding by a predetermined distance L in the entry direction of the slab S, like in an example shown in FIG. 7, to allow the front guide wheel 271 of the upper guide unit 270 to be in contact with and supported by the upper surface of the slab S with a fore end corner portion 51 of the slab S which entering having arrived at a position where scarfing can be performed.

As described above, since the upper guide unit 270 is supported by the upper surface of the slab S with the fore end corner portion 51 having entered the scarfing position, the upper nozzle unit 200 may be supported to maintain the gap from the slab S, and the lower nozzle unit 300 may also be supported to maintain the gap from the slab S by considering a position of the upper nozzle unit 200. Accordingly, it is possible to embody stable scarfing from the fore end corner portion 51 of the slab S to a rear end thereof. That is, in conventional art, with respect to setting initial positions of nozzle units and the slab S, scarfing a fore end corner portion of the slab S is difficult. On the contrary, in the embodiment, it is possible to embody scarfing on the whole area of the corner portion of the slab S.

In the case of the front guide wheel 271 and the rear guide wheel 272 of the upper guide unit 270, as shown in FIG. 8, an external shape of a cross section in contact with the slab S is formed of a curved surface. Accordingly, even when the upper guide unit 270 is pushed in a direction intersecting the moving direction of the slab S while the front guide wheel 271 and the rear guide wheel 272 are in contact with the slab S, an outer surface of the slab S may be prevented from being damaged.

Since the front guide wheel 271 and the rear guide wheel 272 maintain being in contact with the slab S at a high temperature for a long time during a scarfing process, outer surfaces may be coated with carbide to prevent deterioration. Also, the upper guide unit 270, like an example shown in FIG. 8, a cooling water path 274 through which cooling water is supplied may be provided and injection nozzles 275 which inject the cooling water to the front guide wheel 271 and the rear guide wheel 272 may be installed on the cooling water path 274.

The side guide unit 280, as shown in FIGS. 5 and 9, is coupled with the vertical supporting portion 212 of the upper nozzle frame 210, on which the first side nozzle 240 is mounted. The side guide unit 280 includes one or more side guide wheels 281 in contact with the side of the slab S and a wheel housing 282 which supports the side guide wheels 281. The side guide wheel 281 may also be provided in the same form as the front guide wheel 271 of the upper guide unit 270. A cooling water path and injection nozzles for cooling the side guide wheel 281 may be provided in the wheel housing 282 of the side guide unit 280.

Referring to FIG. 5, on the lower nozzle unit 300, a spacer 370 which maintains a gap between the upper nozzle unit 200 and the lower nozzle unit 300 may be installed. The spacer 370 is interposed between the upper nozzle unit 200 and the lower nozzle unit 300 and maintains the gap, thereby accurately maintaining a gap between the lower surface of the slab S and the lower surface nozzle 320. That is, with the position of the upper nozzle unit 200 determined by the upper guide unit 270 and the side guide unit 280, the lower nozzle unit 300 moves upward, and thus the spacer 370 is in contact with the upper nozzle unit 200, thereby accurately maintaining positions of the lower surface nozzle 320 and the second side nozzle 340 according to set conditions.

When a thickness of the slab S to be scarfed changes, the spacer 370 may correspondingly be replaced by another with a different height to adjust the gap between the upper nozzle unit 200 and the lower nozzle unit 300. That is, by only replacing and mounting the spacer 370, the gap between the upper nozzle unit 200 and the lower nozzle unit 300 may be easily adjusted.

Also, in the slab scarfing apparatus according to the embodiment, like in the example shown in FIG. 5, since the first side nozzle 240 is provided on the upper nozzle unit 200 to move together with the upper surface nozzle 220 and the second side nozzle 340 is provided on the lower nozzle unit 300 to move together with the lower surface nozzle 320, even though the thickness of the slab S to be scarfed changes, scarfing of the corner may be embodied without replacing or changing the upper nozzle unit 200 and the lower nozzle unit 300.

Figure 6A:
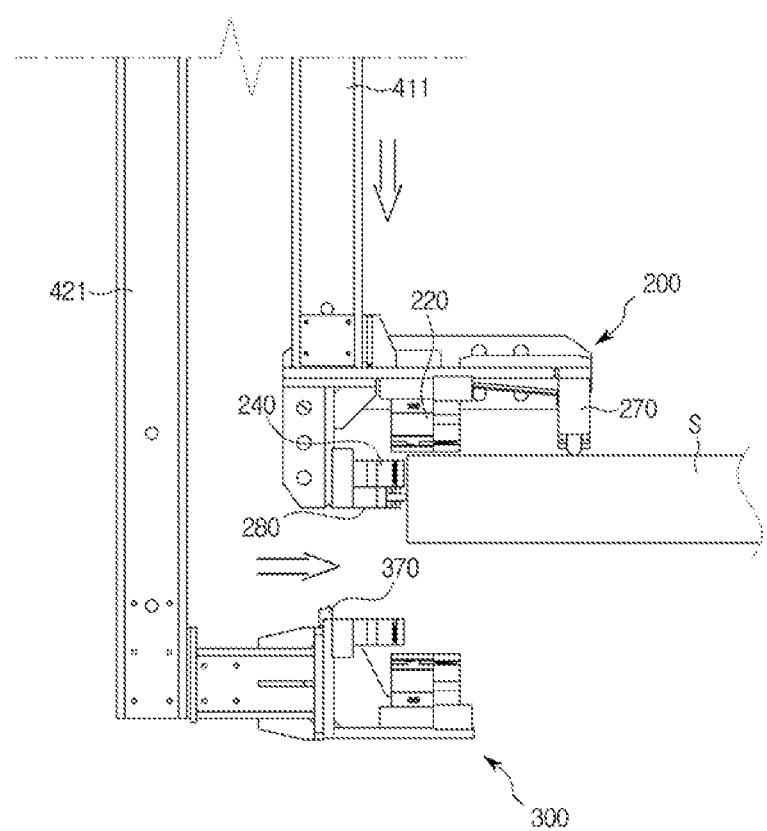
FIGS. 6a to 6c illustrate operations of the upper nozzle unit and the lower nozzle unit of the slab scarfing apparatus which move toward and away from a slab in accordance with one embodiment of the present invention in stages.
Figure 6B:
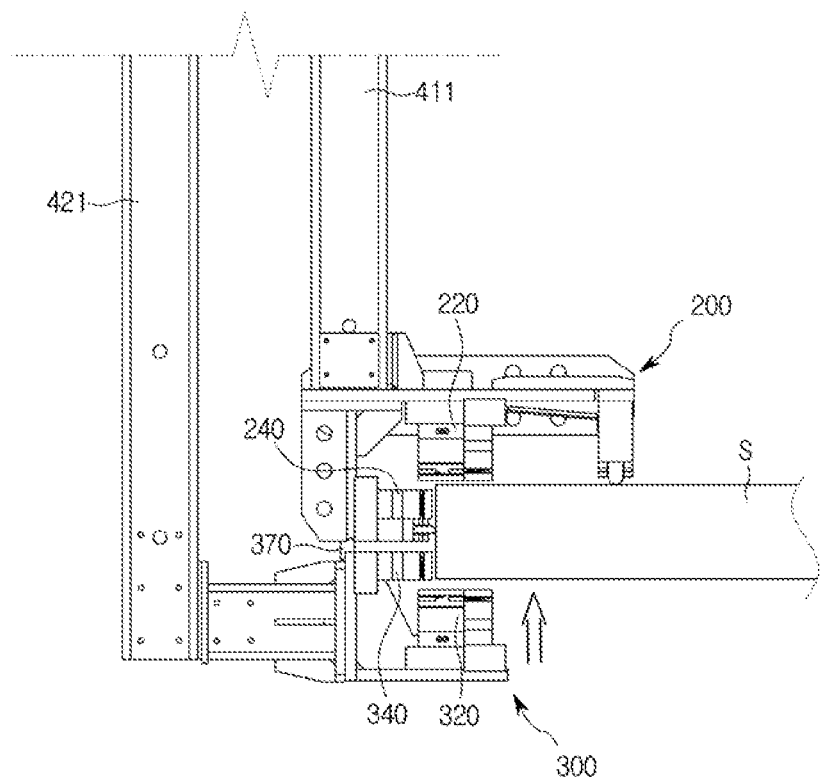
Figure 6C:
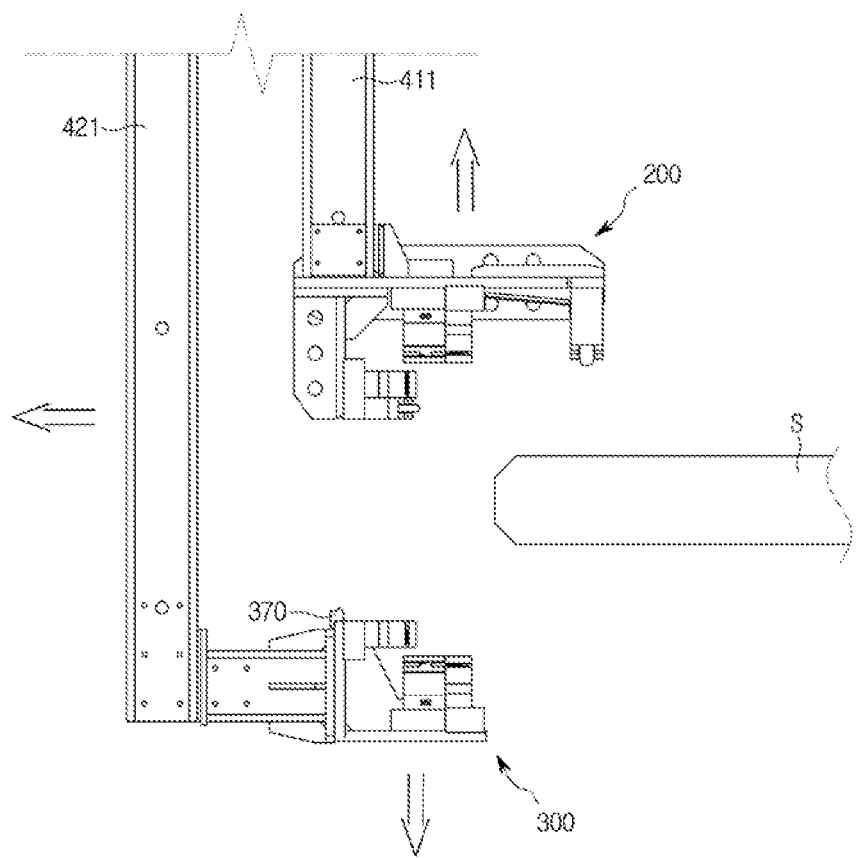

FIGS. 6a to 6c illustrate operations of the upper nozzle unit 200 and the lower nozzle unit 300 to move toward and away from the slab S in stages.

Referring to FIG. 6a, when the slab S enters the position for scarfing, the upper nozzle unit 200 approaches the upper corner of the slab S first. Here, in the upper nozzle unit 200, as the upper guide unit 270 and the side guide unit 280 are in contact with the upper surface and the side surface of the slab S, respectively, a gap between the upper surface nozzle 220 and the slab S and a gap between the first side nozzle 240 and the side of the slab S may be accurately maintained in conditions set for scarfing.

Referring to FIG. 6b, after the position of the upper nozzle unit 200 is determined, the lower nozzle unit 300 moves upward. Here, by having the lower nozzle unit 300 move upward until an upper end of the spacer 370 comes in contact with the upper nozzle unit 200, the gap between the upper nozzle unit 200 and the lower nozzle unit 300 may be accurately maintained in the conditions set for scarfing. That is, a gap between the lower surface nozzle 320 and the lower surface of the slab S and a gap between the second side nozzle 340 and the side of the slab S may be accurately maintained in preset conditions The slab scarfing apparatus may move the slab S in this state and simultaneously and simultaneously, like in an example shown in FIG. 10, may perform scarfing of the corner portion of the slab S.

Referring to FIG. 6c, after the scarfing of the corner of the slab S is completed, the upper nozzle unit 200 and the lower nozzle unit 300 move away from the scarfing position.

Figure 21:
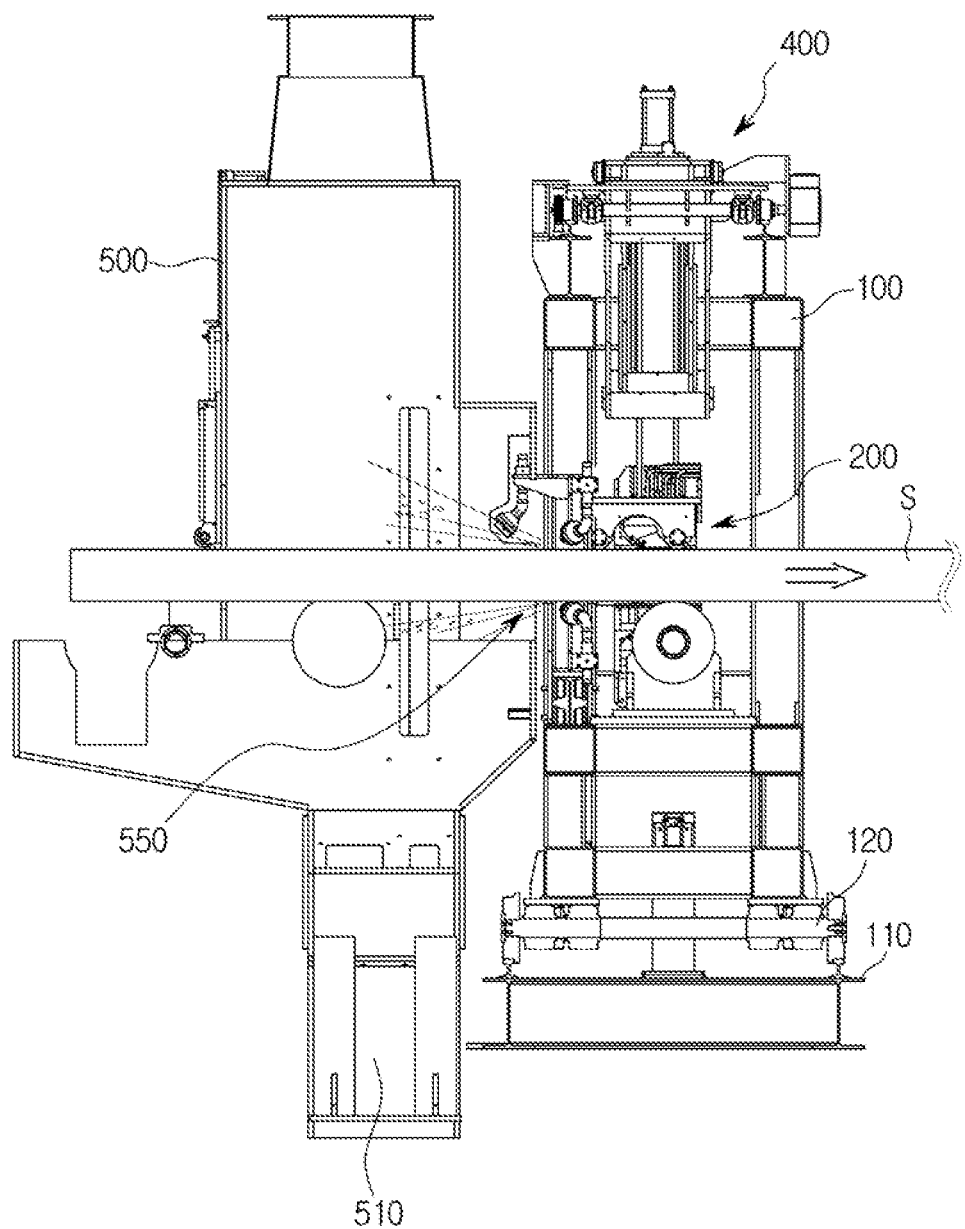
FIG. 21 illustrates components of a slag chamber of the slab scarfing apparatus in accordance with one embodiment of the present invention.

Referring to FIGS. 1 and 21, the slab scarfing apparatus according to the embodiment includes a slag chamber 500 which is installed to surround a front area of the upper nozzle unit 200 and the lower nozzle unit 300 which the slab S enters and collects slag scattered by scarfing of the slab S and a high pressure water injection apparatus 550 disposed in a slag scattering area inside the slag chamber 500 to collect the scattered slag.

The slag chamber 500 surrounds a front space of an area in which scarfing is performed, thus not to allow melted slag to be scattered outward and, below thereof, includes a discharge path 510 through which the collected slag and high pressure water which flows down are discharged.

Figure 22:
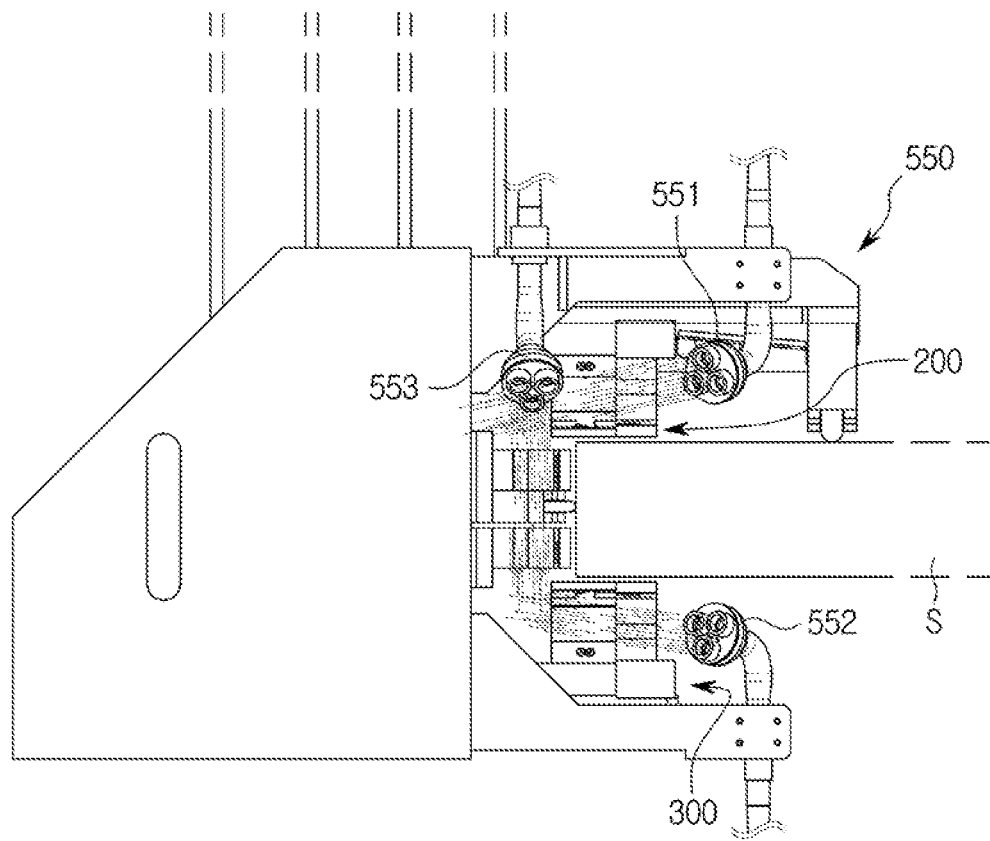
FIG. 22 illustrates components of a high pressure water injection apparatus of the slab scarfing apparatus in accordance with one embodiment of the present invention.

The high pressure water injection apparatus 550, as shown in FIG. 22, may include an upper high pressure water nozzle 551 which injects high pressure water from an upper corner area of the slab S toward the side of the slab S, a lower high pressure water nozzle 552 which injects high pressure water from a lower corner area of the slab S toward the side of the slab S, and a vertical high pressure water nozzle 553 which injects high pressure water from the side of the slab S in a thickness direction of the slab S.

When high pressure water injected to collect slag touches with the slab S, the slab S may develop thermal cracks therein. Accordingly, the high pressure water nozzles 551, 552, and 553 may have injection angles set not to allow the high pressure water to touch the slab S and may adjust the injection angles thereof to change when the thickness or width of the slab changes. Also, the upper high pressure water nozzle 551 and the lower high pressure water nozzle 552 may inject the high pressure water in a spreading shape to cut off the scattered slag, and the vertical high pressure water nozzle 553 may inject the high pressure water in a straight line not to allow the high pressure water to touch the side of the slab S.

Figure 23:
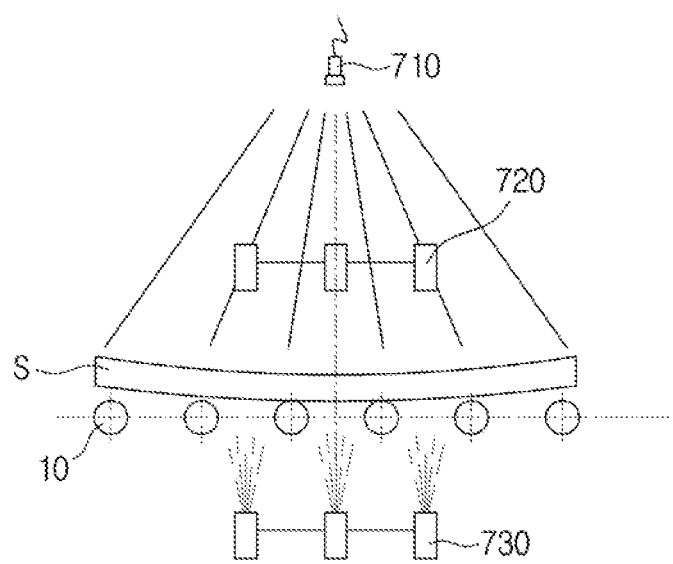
FIGS. 23 and 24 illustrate a slab flexure sensor and a flexure calibration device of the slab scarfing apparatus in accordance with one embodiment of the present invention.
Figure 24:
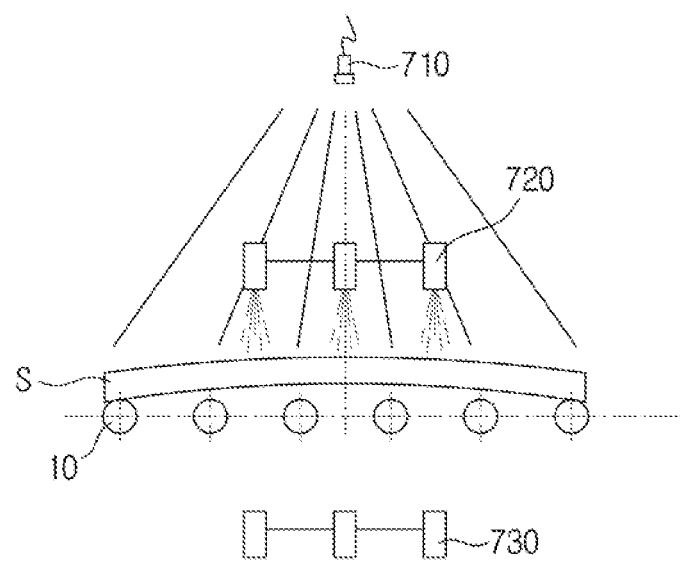

Referring to FIGS. 23 and 24, the slab scarfing apparatus according to the embodiment includes a flexure sensor 710 which measures flexure of the slab S on the transfer line 10 before the scarfing area entering the scarfing area in which the upper nozzle unit 200 and the lower nozzle unit 300 are located, and a flexure correction device which corrects the flexure of the slab S by spraying high pressure cooling water to the upper surface or lower surface of the slab S according to the flexure information from the flexure sensor 710.

The flexure sensor 710 may be formed of a noncontact type ultrasonic sensor, an infrared sensor, etc. The flexure correction device may include a plurality of upper high pressure water spraying nozzles 720 located above the slab S and a plurality of lower high pressure water spraying nozzles 730 located below the slab S.

When the slab S is determined to be bent upward (forming a concave surface on the upper portion) like in an example shown in FIG. 23, based on sensing information of the flexure sensor 710, the flexure correction device may correct the flexure by making a convex surface (the lower surface) contract by spraying the cooling water using the lower high pressure water spraying nozzles 730. On the contrary, when the slab S is determined to be bent downward (forming a concave surface on the lower portion) like in the example shown in FIG. 24, flexure may be corrected by making a convex surface (the upper surface) also contract by spraying the cooling water using the upper high pressure water spraying nozzles 720.

Figure 25:
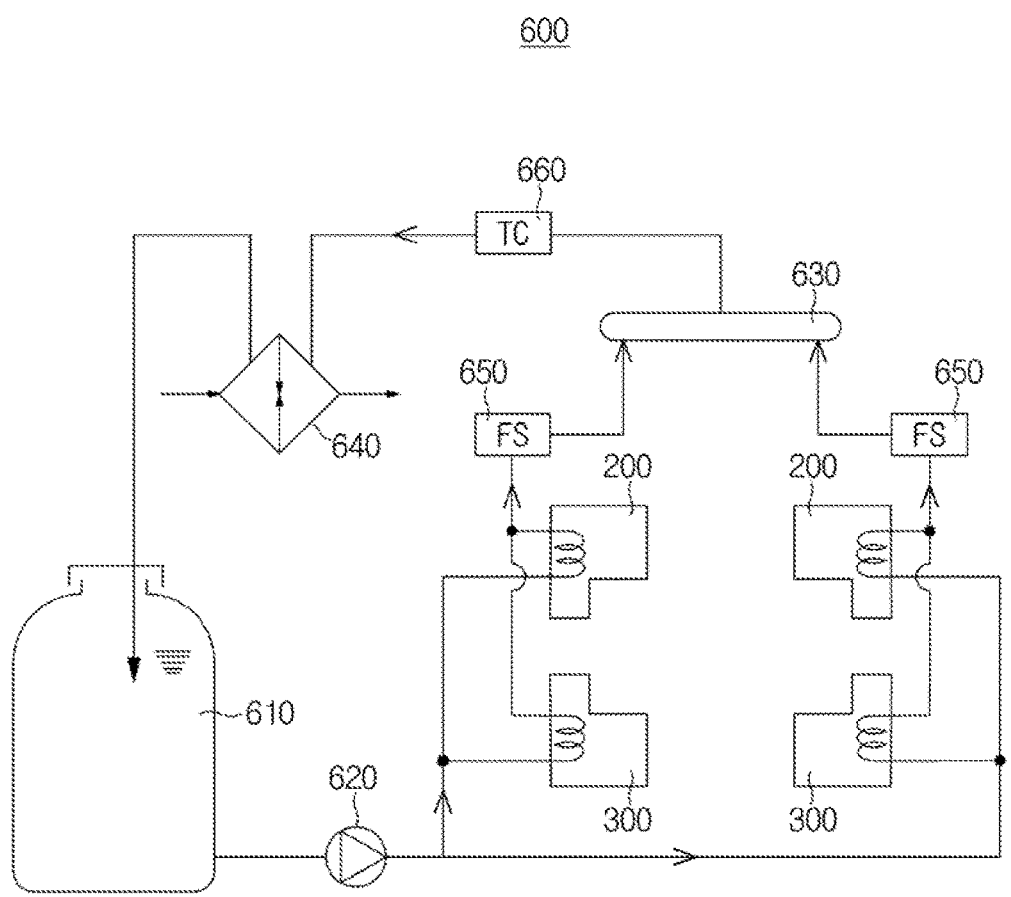
FIG. 25 illustrates a cooling system which cools the upper nozzle unit and the lower nozzle unit of the slab scarfing apparatus in accordance with one embodiment of the present invention.

Also, the slab scarfing apparatus according to the embodiment, as shown in FIG. 25, includes a cooling system 600 which cools the upper nozzle unit 200 and the lower nozzle unit 300 by circulating cooling water through the upper nozzle unit 200 and the lower nozzle unit 300.

The cooling system 600 includes a cooling water tank 610 in which cooling water is stored, a cooling water pump 620 which supplies the cooling water of the cooling water tank 610 to cooling water paths of the upper nozzle unit 200 and the lower nozzle unit 300, and a water collecting header 630 which collects and returns the cooling water passing through the upper nozzle unit 200 and the lower nozzle unit 300 to the cooling water tank 610. Also, the cooling system 600 may include a thermal exchanger 640 in which the cooling water which returns from the water collecting header 630 to the cooling water tank 610 undergoes a thermal exchange with an external cooling means, a fluid flow sensor 650 installed on a path for collecting the cooling water passing through the upper nozzle unit 200 and the lower nozzle unit 300, and a temperature sensor 660 which senses a temperature of the cooling water collected in the water collecting header 630.

The cooling system 600 cools the upper nozzle unit 200 and the lower nozzle unit 300 by allowing the cooling water of the cooling water tank 610 to circulate through a flow path provided in each of nozzles of the upper nozzle unit 200 and the lower nozzle unit 300 while the scarfing of the slab S is performed.

A control portion of the slab scarfing apparatus may determine whether a flow of the cooling water is adequate by sensing the cooling water discharged through the upper nozzle unit 200 and the lower nozzle unit 300 using the fluid flow sensor 650. Here, the scarfing may be continuously performed when the flow of the cooling water is determined to be adequate, and a scarfing operation may be stopped to protect the equipment when the flow of the cooling water is not determined to be adequate.

Also, the control portion of the slab scarfing apparatus may sense a temperature of the cooling water discharged through the upper nozzle unit 200 and the lower nozzle unit 300 using the temperature sensor 660 and may determine whether cooling of the upper nozzle unit 200 and the lower nozzle unit 300 using the cooling water is adequate by this. After the determination, when it is determined that the cooling of the upper nozzle unit 200 and the lower nozzle unit 300 using the cooling water is inadequate, the scarfing operation may also be stopped to protect the equipment.

Figure 26:
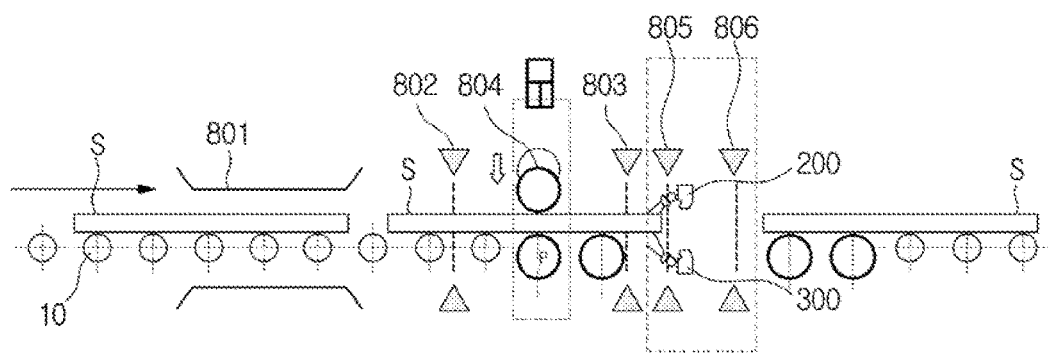
FIG. 26 illustrates a calibration device of a slab supplied to a scarfing area, a transfer path of the slab, and components of various sensors provided in the scarfing area in the slab scarfing apparatus in accordance with one embodiment of the present invention.

Referring to FIG. 26, the slab scarfing apparatus according to the embodiment includes a correction device 801 which corrects a posture of the slab S on the transfer line 10 before the scarfing area entering the scarfing area in which the upper nozzle unit 200 and the lower nozzle unit 300 are located, a width measuring sensor 802 which measures the width of the slab S to sense eccentricity of the slab S which enters after passing through the correction device 801, and an entry sensor 803 which senses an entry of a fore end of the slab S at a position before the scarfing area. Also, the slab scarfing apparatus may include a pinch roll 804 which transfers the slab S in a clamped state to the scarfing area after the slab S enters, a nozzle position sensor 805 which senses elevated positions of the upper nozzle unit 200 and the lower nozzle unit 300 to prevent collisions between the slab S and the upper nozzle unit 200 and the lower nozzle unit 300, and a completion sensor 806 which senses whether the scarfing is completed by sensing the transferred slab S.

Here, the width measuring sensor 802, the entry sensor 803, the nozzle position sensor 805, and the completion sensor 806 may be formed of noncontact type sensors such as ultrasonic sensors, infrared sensors, laser sensors, etc.

The slab scarfing apparatus according to the embodiment may correct the posture of the slab S during a process of supplying the slab S to the scarfing area and may embody stable scarfing of the corner portion of the slab S in a state in which the upper nozzle unit 200 and the lower nozzle unit 300 are accurately located in the scarfing area using such devices described above. Also, when the slab S enters and then the upper nozzle unit 200 and the lower nozzle unit 300 are moved to the scarfing area, the nozzle position sensor 805 may sense the positions of the upper nozzle unit 200 and the lower nozzle unit 300, thereby preventing the collisions between the slab S and the upper and lower nozzle units 200 and 300.

Figure 27:
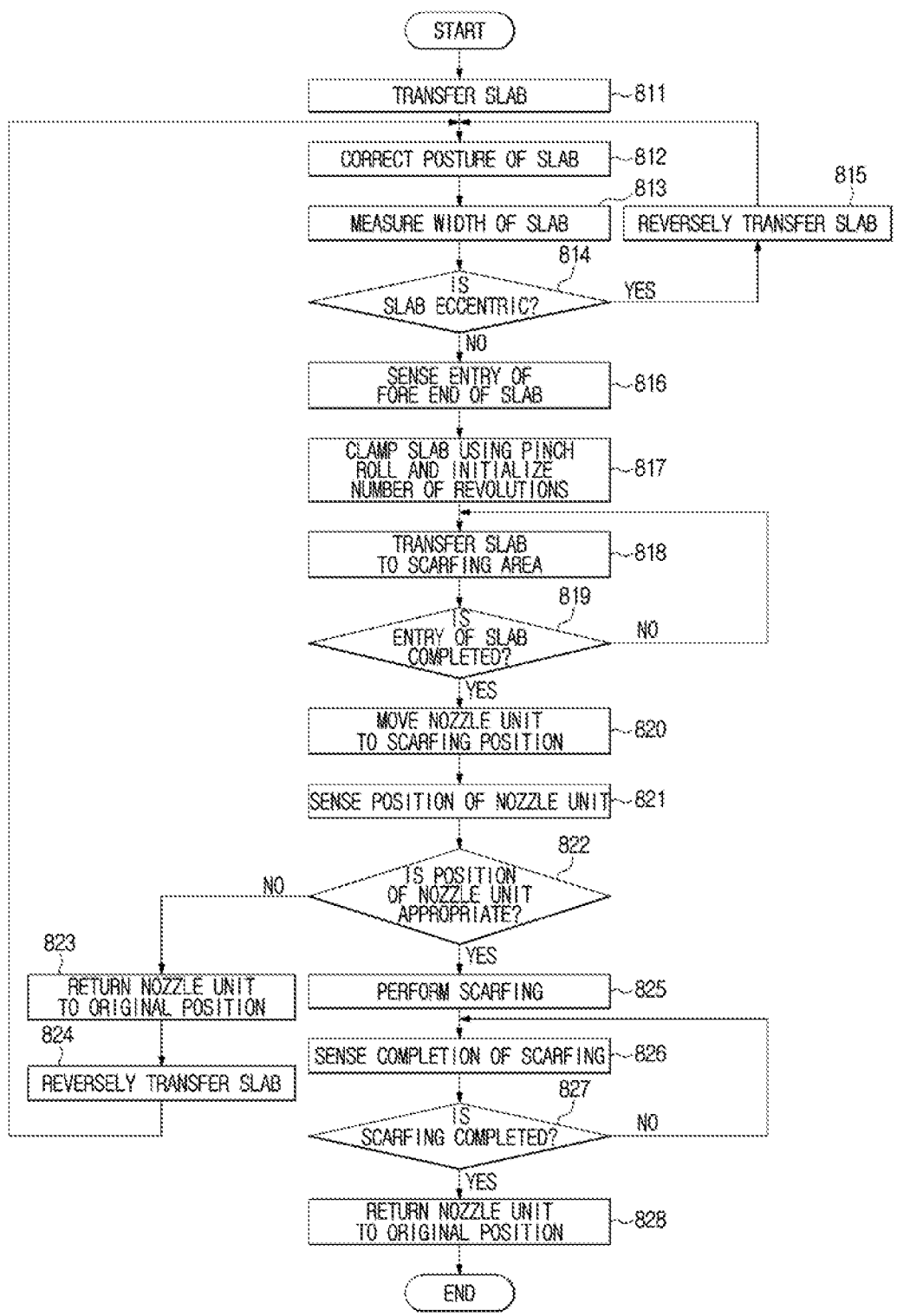
FIG. 27 is a flowchart illustrating a method of controlling the slab scarfing apparatus in accordance with one embodiment of the present invention.

Next, referring to FIGS. 26 and 27, a method of controlling the slab scarfing apparatus which embodies such operations will be described.

When preparing for scarfing the slab S is finished by supplying the slab S to be scarfed is supplied to the transfer line 10 and then a command for scarfing is given, the control portion moves the slab S to a scarfing area by operating the transfer line 10 (811). Also, a posture of the transferred slab S is corrected using the correction device 801 (812). The correction device 801 may be formed of a hydraulic cylinder, etc. which corrects a position by pushing the slab S on a side, etc. so that the slab S may be appropriately transferred along a set transfer path.

After the operation (812) of correcting the posture of the slab S, a width of the slab S which enters the scarfing area is measured using the width measuring sensor 802 (813), and whether the slab S is in an eccentric state is determined based on measured width information of the slab S (814). Here, when the slab S transferred to the scarfing area is determined to be eccentric, the slab S is transferred backward (815), and the operation of correcting the posture of the slab S is performed again using the correction device 801 described above (812).

In the operation (814) of determining whether the slab S is eccentric, when the slab S is not determined to be eccentric, whether a fore end of the slab S enters is sensed using the entry sensor 803, while the slab S is allowed to enter the scarfing area (816).

When the entry sensor 803 senses the fore end of the slab S which enters the scarfing area, the slab S is clamped using the pinch roll 804 to be transferred for scarfing, and a number of revolutions of the pinch roll 804 is initialized simultaneously with the clamping (817). Also, in this state, the pinch roll 804 is operated to gradually transfer the slab S until a fore end corner of the slab S arrives at a scarfing position (818). Here, a transfer distance of the slab S is determined based on a number of revolutions of the pinch roll 804 while operating the pinch roll 804, thereby controlling the corner of the fore end of the slab S to precisely arrive at the scarfing position.

After the fore end corner of the slab S arrives at the scarfing position, the upper nozzle unit 200 and the lower nozzle unit 300 are moved to the scarfing position (820). That is, nozzles of the upper nozzle unit 200 and nozzles of the lower nozzle unit 300 approach the slab S to prepare for scarfing.

Meanwhile, the slab S entrance may not be good due to slipping, and, in such a state, the upper nozzle unit 200 and the lower nozzle unit 300 may move to the scarfing position. In this case, a situation in which the upper guide unit 270 of the upper nozzle unit 200 is not in contact with the slab S may occur, thereby performing abnormal scarfing or, in a more serious case, causing a collision between the slab S and the upper nozzle unit 200. Accordingly, when the upper nozzle unit 200 and the lower nozzle unit 300 are moved to the scarfing position, positions of the upper nozzle unit 200 and the lower nozzle unit 300 which are moving are sensed using the nozzle position sensor 805 (821), and whether the positions of the upper nozzle unit 200 and the lower nozzle unit 300 are appropriate (822) is determined.

In the operation 822, when it is determined that the positions of the upper nozzle unit 200 and the lower nozzle unit 300 are not appropriate, the upper nozzle unit 200 and the lower nozzle unit 300 are separated from the slab S and returned to original positions (823), and the slab S is reversely transferred to the correction device 801 to allow the correction device to correct the posture of the slab S again (824).

In the operation 822, when it is determined that the upper nozzle unit 200 and the lower nozzle unit 300 have appropriately moved to the scarfing position, scarfing of the slab S is performed using the upper nozzle unit 200 and the lower nozzle unit 300 while transferring the slab S (825). After performing the scarfing, passing of the slab S is sensed by the completion sensor 806 (826), and whether the scarfing is completed is determined based thereon (827). Also, when the scarfing is determined to be completed, the upper nozzle unit 200 and the lower nozzle unit 300 are moved to the original positions (828), and the scarfing is finished.

The invention claimed is:

1. A slab scarfing apparatus comprising:
   an upper nozzle unit which comprises an upper surface nozzle which scarfs a corner portion of an upper surface of a slab and a first side nozzle which moves together with the upper surface nozzle while scarfing an upper corner portion of a side of the slab;
   a lower nozzle unit which comprises a lower surface nozzle unit which scarfs a corner portion of a lower surface of the slab and a second side nozzle which moves together with the lower surface nozzle while scarfing a lower corner portion of the side of the slab;
   a movement apparatus which moves the upper nozzle unit and the lower nozzle unit to be closer to or away from a corner portion of the slab, wherein the movement apparatus comprises: a first vertical movement portion which vertically moves the upper nozzle unit a second vertical movement portion which vertically moves the lower nozzle unit and a laterally moving portion which laterally moves while supporting the first vertical movement portion and the second vertical movement portion;
   a frame capable of moving in a direction intersecting with a moving direction of the slab while being mounted on the laterally moving portion;
   a moving rail which guides movement of the frame; and
   a frame driving portion which moves the frame.

2. The slab scarfing apparatus of claim 1, wherein the upper nozzle unit comprises an upper nozzle frame which comprises a horizontal supporting portion mounted with the upper surface nozzle and a vertical supporting portion mounted with the first side nozzle, and
   wherein the lower nozzle unit comprises a lower nozzle frame which comprises a horizontal supporting portion mounted with the lower surface nozzle and a vertical supporting portion mounted with the second side nozzle.

3. The slab scarfing apparatus of claim 2, wherein the upper surface nozzle is mounted on the horizontal supporting portion of the upper nozzle frame to be position-adjustable in a width direction of the slab, and
   wherein the lower surface nozzle is mounted on the horizontal supporting portion of the lower nozzle frame to be position-adjustable in the width direction of the slab.

4. The slab scarfing apparatus of claim 1, further comprising:
   an upper guide unit which is installed on the upper nozzle unit to be in contact with an upper surface of the slab and maintains a gap between the upper surface of the slab and the upper surface nozzle; and
   a side guide unit which is installed to be in contact with a side of the slab and maintains a gap between the side of the slab and the first side nozzle.

5. The slab scarfing apparatus of claim 4, wherein the upper guide unit is provided to protrude in a direction in which the slab enters rather than the upper surface nozzle.

6. The slab scarfing apparatus of claim 1, wherein the upper surface nozzle and the lower surface nozzle each comprise a preheating gas injection hole which forms flames for preheating the slab and an oxygen injection hole which embodies scarfing by injecting high pressure oxygen to a portion of the slab to be preheated.

7. The slab scarfing apparatus of claim 6, wherein the upper surface nozzle and the lower surface nozzle each further comprise a fuel gas injection hole which heat the oxygen injected by the oxygen injection hole and guide an injection direction.

8. The slab scarfing apparatus of claim 1, wherein the upper nozzle unit further comprises an oxygen injection hole disposed on a side of the upper surface nozzle to inject oxygen to a portion to be scarfed by the upper surface nozzle and an auxiliary upper nozzle comprising a fuel gas injection hole which heats the oxygen injected by the oxygen injection hole and guides the injection, and
   wherein the lower nozzle unit further comprises an oxygen injection hole disposed on a side of the lower surface nozzle to inject oxygen to a portion to be scarfed by the lower surface nozzle and an auxiliary lower nozzle comprising a fuel gas injection hole which heats the oxygen injected by the oxygen injection hole and guides the injection.

9. The slab scarfing apparatus of claim 8, wherein the upper surface nozzle and the lower surface nozzle each comprises an outlet cartridge partially detachably mounted to change a shape of the oxygen injection hole.

10. The slab scarfing apparatus of claim 1, wherein the first side nozzle comprises an oxygen injection hole which injects oxygen for scarfing to an upper corner portion of a side of the slab and a fuel gas injection hole which heats the oxygen injected by the oxygen injection hole and guides the injection, and
    wherein the second side nozzle comprises an oxygen injection hole which injects oxygen for scarfing to a lower corner portion of the side of the slab and a fuel gas injection hole which heats the oxygen injected by the oxygen injection hole and guides the injection.

11. The slab scarfing apparatus of claim 1, wherein the upper nozzle unit, the lower nozzle unit, and the movement apparatus are disposed on each side of the slab, and
    wherein at least one of the upper nozzle unit and the lower nozzle unit selectively operates to selectively scarf at least one of four corner portions of the slab.

12. A slab scarfing apparatus comprising:
    an upper nozzle unit which comprises an upper surface nozzle which scarfs a corner portion of an upper surface of a slab and a first side nozzle which moves together with the upper surface nozzle while scarfing an upper corner portion of a side of the slab;
a lower nozzle unit which comprises a lower surface nozzle unit which scarfs a corner portion of a lower surface of the slab and a second side nozzle which moves together with the lower surface nozzle while scarfing a lower corner portion of the side of the slab;
a movement apparatus which moves the upper nozzle unit and the lower nozzle unit to be closer to or away from a corner portion of the slab; and
a slag chamber which is installed to surround front areas of the upper nozzle unit and the lower nozzle unit which the slab enters and collects slag scattered by scarfing of the slab and a high pressure water injection apparatus disposed in a slag scattering area inside the slag chamber.

13. A slab scarfing apparatus comprising:
an upper nozzle unit which comprises an upper surface nozzle which scarfs a corner portion of an upper surface of a slab and a first side nozzle which moves together with the upper surface nozzle while scarfing an upper corner portion of a side of the slab;
a lower nozzle unit which comprises a lower surface nozzle unit which scarfs a corner portion of a lower surface of the slab and a second side nozzle which moves together with the lower surface nozzle while scarfing a lower corner portion of the side of the slab;
a movement apparatus which moves the upper nozzle unit and the lower nozzle unit to be closer to or away from a corner portion of the slab;
a correction device which corrects a posture of the slab on a transfer path before entering a scarfing area in which the upper nozzle unit and the lower nozzle unit are located;
a width measuring sensor which measures a width of the slab to sense eccentricity of the slab which have passed through the correction device;
an entry sensor which senses an entry of a fore end of the slab at a position before the scarfing area;
a pinch roll which transfers the slab to the scarfing area in a clamped state after the entry of the slab; and
a nozzle position sensor which senses elevated positions of the upper and lower nozzle units to prevent a collision of the slab and the upper and lower nozzle units.

14. A slab scarfing apparatus comprising:
an upper nozzle unit which comprises an upper surface nozzle which scarfs a corner portion of an upper surface of a slab and a first side nozzle which moves together with the upper surface nozzle while scarfing an upper corner portion of a side of the slab;
a lower nozzle unit which comprises a lower surface nozzle unit which scarfs a corner portion of a lower surface of the slab and a second side nozzle which moves together with the lower surface nozzle while scarfing a lower corner portion of the side of the slab;
a movement apparatus which moves the upper nozzle unit and the lower nozzle unit to be closer to or away from a corner portion of the slab;
a flexure sensor which measures flexure of the slab on a transfer path before the scarfing area entering a scarfing area where the upper nozzle unit and the lower nozzle unit are located; and
a flexure correction device which corrects the flexure of the slab by spraying high pressure cooling water to the upper surface or the lower surface of the slab according to flexure information from the flexure sensor.

* * * * *